(12) United States Patent
Berry

(10) Patent No.: US 11,148,148 B2
(45) Date of Patent: Oct. 19, 2021

(54) MULTISTAGE HAMMER MILL AND A RESIDUE PROCESSING SYSTEM INCORPORATING SAME

(71) Applicant: Seed Terminator Holdings Pty Ltd, Kingscote (AU)

(72) Inventor: Nicholas Kane Berry, Kingscote (AU)

(73) Assignee: Seed Terminator Holdings Pty Ltd, Kingscote (AU)

( * ) Notice: Subject to any disclaimer, the term of this patent is extended or adjusted under 35 U.S.C. 154(b) by 317 days.

(21) Appl. No.: 16/336,171

(22) PCT Filed: Sep. 25, 2017

(86) PCT No.: PCT/AU2017/051041
§ 371 (c)(1),
(2) Date: Mar. 25, 2019

(87) PCT Pub. No.: WO2018/053600
PCT Pub. Date: Mar. 29, 2018

(65) Prior Publication Data
US 2019/0283034 A1    Sep. 19, 2019

(30) Foreign Application Priority Data

Sep. 23, 2016 (AU) .............................. 2016903873

(51) Int. Cl.
*B02C 13/18* (2006.01)
*B02C 13/00* (2006.01)
*A01F 12/40* (2006.01)

(52) U.S. Cl.
CPC ............ *B02C 13/185* (2013.01); *B02C 13/00* (2013.01); *B02C 13/18* (2013.01); *A01F 12/40* (2013.01); *B02C 2013/1857* (2013.01)

(58) Field of Classification Search
CPC ......... B02C 13/00; B02C 13/14; B02C 13/18; B02C 13/185; B02C 2013/1857;
(Continued)

(56) References Cited

U.S. PATENT DOCUMENTS 2,440,927 A    5/1948  Boss et al.
2,557,865 A    6/1951  Emmanouilidis
(Continued)

FOREIGN PATENT DOCUMENTS

AU    7175996    5/1997
AU    3878101    10/2001
(Continued)

OTHER PUBLICATIONS

International Search Report for Application No. PCT/AU2017/051041 dated Jan. 5, 2018 (7 pages).
(Continued)

*Primary Examiner* — Shelley M Self
*Assistant Examiner* — Smith Oberto Bapthelus
(74) *Attorney, Agent, or Firm* — Michael Best & Friedrich LLP

(57) ABSTRACT

A multistage hammer mill (10) has a plurality of milling stages arranged concentrically about each other. The plurality of milling stages arranged so that substantially all material in a first inner most of the milling stages passes through all subsequent adjacent milling stages. The milling stages include a first milling stage and a second milling stage. A central feed opening (12) enables material flow into a primary impact zone (14) of the first milling stage. The first milling stage has an impact mechanism (16) and a first screen arrangement (20a). The impact mechanism (16) rotates about a rotation axis (18). The first screen arrangement (20a) is disposed circumferentially about and radially spaced from the impact mechanism (16) and is provided
(Continued)

with a plurality of apertures (22) through which impacted material of a first size range can pass. The second milling stage has a second arrangement (20b) disposed circumferentially about and radially spaced from the first screen arrangement (20a) and a circular array of impact elements (50a) disposed between the first screen arrangement (20a) and the second screen arrangement (20b).

29 Claims, 14 Drawing Sheets

(58) Field of Classification Search
CPC ......... B02C 23/10; B02C 23/14; B02C 23/38; A01F 12/40
USPC ........................................ 241/74, 189.1, 284
See application file for complete search history.

(56) References Cited

U.S. PATENT DOCUMENTS

| | | | |
|---|---|---|---|
| 2,557,867 A * | 6/1951 | Forster | G01M 1/06 74/16 |
| 3,448,933 A | 6/1969 | Roy | |
| 3,894,695 A | 7/1975 | Benedikter | |
| 4,813,619 A | 3/1989 | Tjumanok et al. | |
| 5,059,154 A | 10/1991 | Reyenga | |
| 5,667,150 A | 9/1997 | Arasmith et al. | |
| 8,152,610 B2 | 4/2012 | Harrington | |
| 2002/0147038 A1 | 10/2002 | McLeod et al. | |
| 2007/0015556 A1 | 1/2007 | Johnson et al. | |
| 2015/0373913 A1* | 12/2015 | Berry | A01D 41/12 460/111 |
| 2016/0082441 A1 | 3/2016 | Callens et al. | |
| 2016/0150727 A1 | 6/2016 | Mayerle | |
| 2018/0070534 A1* | 3/2018 | Mayerle | A01D 41/1243 |

FOREIGN PATENT DOCUMENTS

| | | |
|---|---|---|
| DE | 10203502 | 10/2003 |
| DE | 20210431 | 12/2003 |
| FR | 2776468 | 10/1999 |
| WO | 2009100500 | 8/2009 |
| WO | 2014127408 | 8/2014 |
| WO | 2017008161 | 1/2017 |

OTHER PUBLICATIONS

International Preliminary Report on Patentability for Application No. PCT/AU2017/051041 dated Jul. 3, 2018 (26 pages).

* cited by examiner

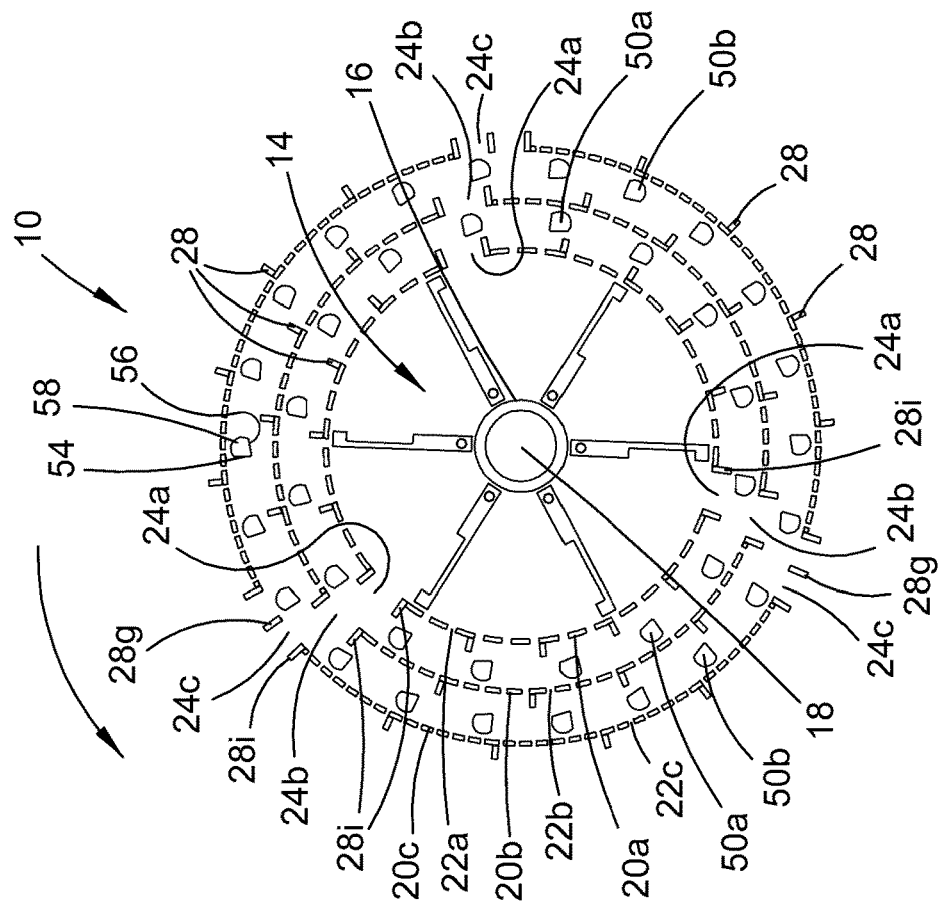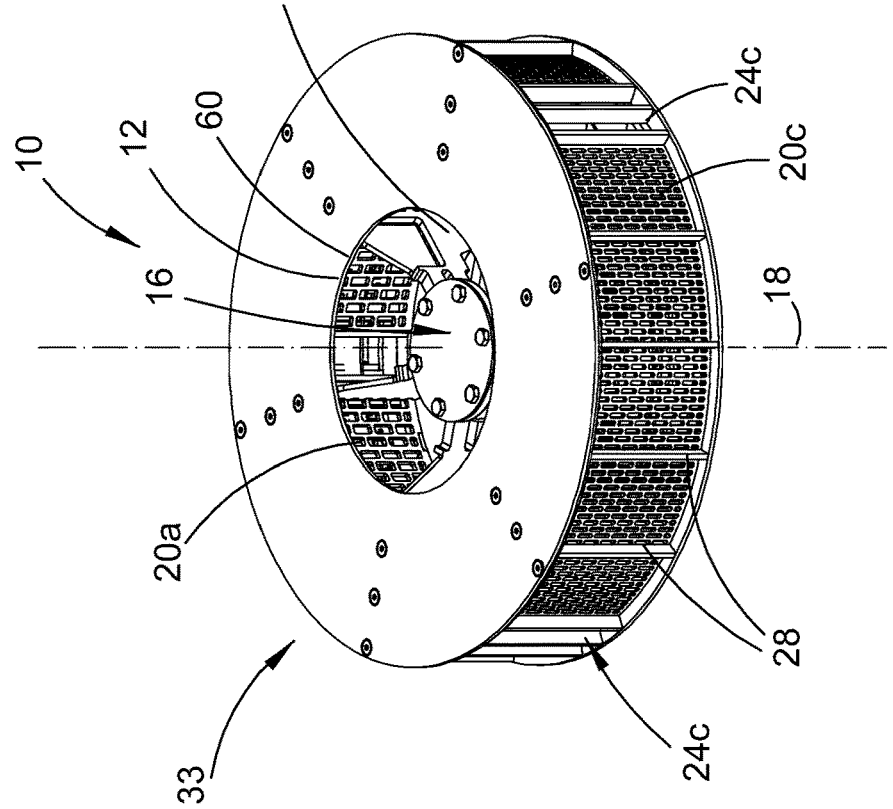

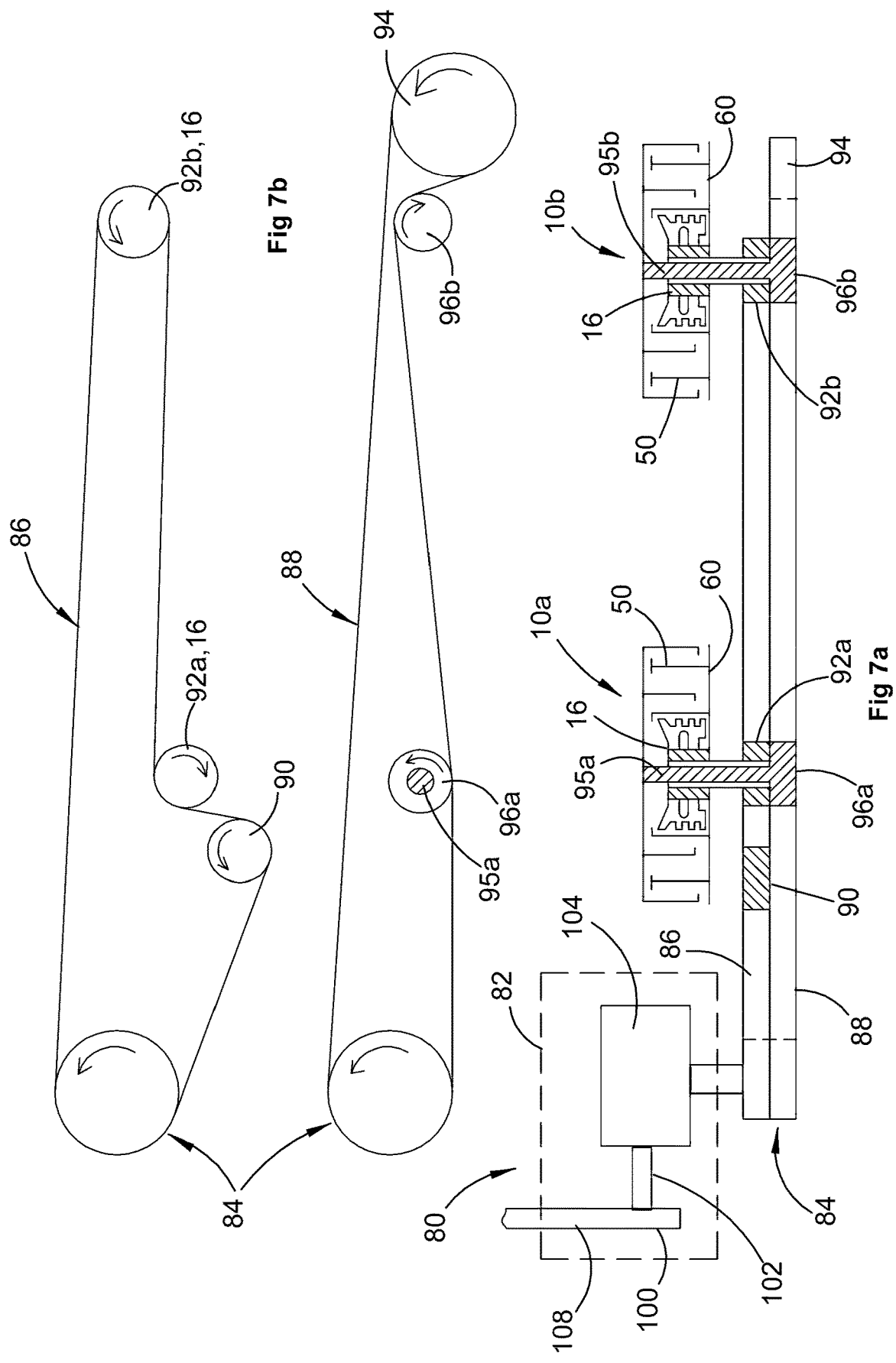

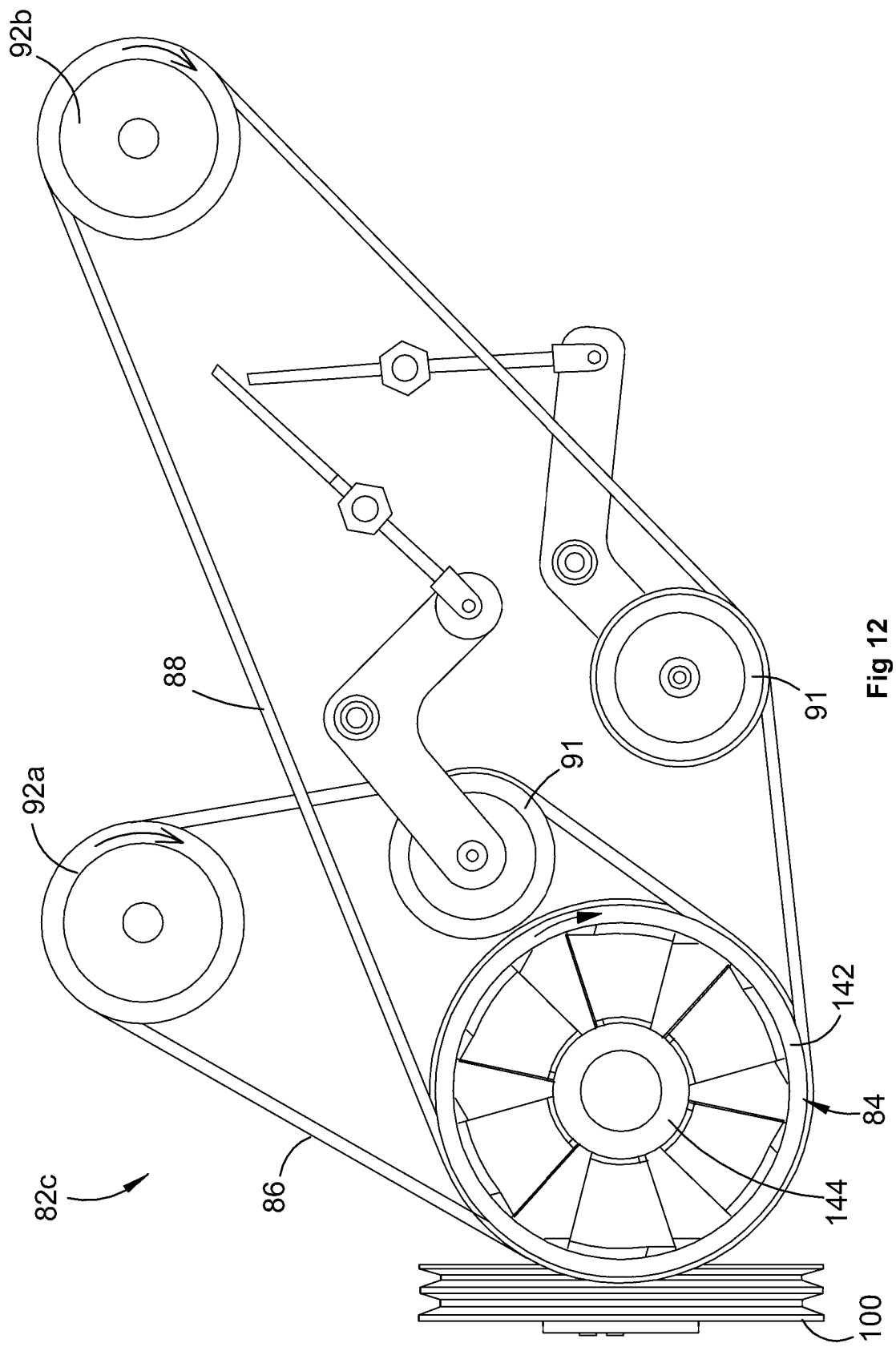

MULTISTAGE HAMMER MILL AND A RESIDUE PROCESSING SYSTEM INCORPORATING SAME

TECHNICAL FIELD

A multistage hammer mill of a type suitable for the devitalisation of weed seeds and fragmentation of organic matter is disclosed. Also disclosed is a residue processing system which incorporates one or more multistage of the disclosed hammer mills or alternate residue processing devices.

BACKGROUND ART

Weeds and weed control are, and always have been, one of the biggest constraints and costs to grain production. Weeds are a perpetual problem that limits the food production capacity of agricultural area around the globe. Weeds compete with the cultivated crops for water, sunlight and nutrients. In the past 50 years there has been a shift from tillage being the most important method to control weeds to herbicides being the most important tool to control weeds. Herbicides in general provide much better control of weeds than tillage methods and do not have the major issues of soil erosion, moisture loss and breakdown of soil structure. The wide spread use and reliance of herbicides has resulted weeds evolving resistance to herbicides. The herbicide resistance is now widespread and presents one of the biggest threats to global food security. Strategies to provide non-chemical weed control to compliment herbicides are now paramount to reduce the selection pressure for herbicide resistance. One particular method of significant renewed interest is destroying weed seeds at harvest time to interrupt the weed cycle.

Many in crop weeds share a similar life cycle to harvested crops. Once a crop matures and is harvested, there is a broad range of weeds that have viable seeds remaining on the plant above the cutting height of the harvester. These weeds enter the harvester and their seeds either end up in a grain tank, out with straw residues, or out with chaff residues. There are a range of factors that determine where a weed seed will end up at harvest time including moisture content, maturity, and harvester setup. A major factor that determines where a seed ends up is the aerodynamic properties of the seeds or its terminal velocity. Often a weed seed is much lighter than the grain being harvested. Crop cleaning system used during harvesting employ a winnowing action to remove light chaff material from the heavier grain using airflow and mechanical sieving. The light weed seeds are caught in the wind and can exit the back of the harvester sieve. The residues and contained weed seeds are then spread on the ground to be a problem for next year. The residues also contain a proportion of grain being harvested that could not be separated by the harvester. This grain loss has the potential to become a volunteer weed after harvest. There is an opportunity to intercept and destroy weed seeds in the residues before allowing them to become a problem for next year's crop.

One method to destroy these weed seeds is to use a milling technology. Milling technology has been used for particle size reduction of a range of feedstock for over a century. Milling technology can be separated into crushing and impact technology.

The most common crushing size reduction technology is the roller mill. Roller mills have been investigated for the purpose of destroying weed seeds at harvest time. Roy and Bailey (1969) U.S. Pat. No. 3,448,933 describe a roller shear mill for destroying weed seeds out of clean grain screenings. Reyenga (1991) U.S. Pat. No. 5,059,154 describes using a separating device and roller mill to crush foreign matter such as weed seeds. A limitation of the roller mill is the ability to handle the bulk of residue material that contains the weed seeds and thus rely on a separation means to reduce the residue material.

Impact mills use high impact speeds generated by rotating elements to pulverise material. Impact mills have also been of interest for the destruction of weed seeds at harvest.

A widely used type of impact mill is a hammer mill, which uses a rotor with impact elements to pulverise material and a screen to classify the output size distribution. Hammer mills are highly versatile and are able to accept a wide range feed materials.

Plant material such as crop residues is fibrous and difficult to process. The use of hammer mills to devitalise weed seeds in crop residues has been well documented. The use of hammer mills on board a harvester to devitalise weed seeds has been subject of multiple patents (e.g. Wallis (1995) AU1996071759 Bernard (1998) FR2776468B1)).

An advantage of hammer mills is that in addition to impact, they induce crushing, shear and attrition forces that make them particularly useful for size reduction of fibrous materials. Another advantage of hammer mills is that they often have flexible impact elements that are replaceable and can handle some foreign objects without damage.

A further advantage of the hammer mill is that the screen size controls particle fineness and can then control the proportion of weed devitalisation. Control of output size distribution is particularly valuable in the processing of crop residues where material type and moisture conditions change significantly. Change in material conditions result in still similar output size distribution and weed seed devitalisation remains less dependent on material conditions than would be without the use of screens.

A disadvantage of current hammer mills is that the screen which controls particle size distribution determines throughput capacity. In general, to devitalise weed seeds a small screen size is required and hence throughput capacity is limited. A hammer mill with concentric screens of varying sizes has been described by Emmanouilidis (1951) U.S. Pat. No. 2,557,865. The Emmanouilidis mill has a central impact zone and additional screens are used to separate output material into different size fractions. The inner primary zone in the Emmanouilidis mill still dictates capacity and overall size reduction.

A different type of impact mill is a cage mill. A cage mill applies predominantly impact forces and level of size reduction is set through rotational speed and the number of concentric rows of bars. There is no classification of particle size with a cage mill. The impact forces in a cage mill make them suitable for friable or brittle materials and are not widely used for processing fibrous materials. However, one example is described in AU 2001/038781 (Zani) which is proposed for destruction of weed seeds. The Zani cage mill has concentric rows of impact elements supported by a ring. The mill is driven at high impact speed to destroy weed seeds. The arrangement can be neatly integrated into the harvester. The arrangement however has limited capacity and cannot process the entire chaff residue fraction exiting the harvesters sieve. Therefore, the Zani system relied on sieving to concentrate the collect weed seeds for processing.

An increased capacity cage mill is described in WO 2009/100500 (Harrington) to handle the whole chaff material fraction to destroy weed seeds. The Harrington used a large counter rotating cage mill that has fan blades similar to Tjumanok et al 1989 (U.S. Pat. No. 4,813,619) to increase airflow and capacity. This cage mill is large, heavy, requires a complex counter rotating drive and requires considerable power to operate. The system has its own power package and is towed behind the grain harvester. The size, weight and drive, limits options to integrate the cage mill into the harvester. The mill incorporates cylindrical bars that limit impact speeds because of glancing blows. The impact speed therefore has a large distribution. To get sufficient impact energy into weed seeds requires counter rotation of the cage structures.

The current state of the art for seed destroying mill technology is described in PCT/AU2014/218502 (Berry Saunders). Berry Saunders uses a rotor stator cage mill that is much simpler to integrate into a grain harvester than the counter rotation systems. The Berry Saunders mill provides an advance on the Zani cage mill by improving the throughput capacity and seed kill performance of the mill system. It achieves this by using a central distribution element (also described in Isaak (2003) DE 10203502) and angular static bars that are slanted against the rotation of the rotor. A purportedly novel aspect of Berry Saunders mill is the spacing between the angled impact bars determines if a seed will pass through to the next row of impact bars or stay within the current row of impact bars. The size of the seed does not determine if it passes through the row of impact bars or remains.

The relatively simple workings of cage mills which apply predominantly impact and do not use size classification has enabled computer modelling techniques to be used to predict mill performance. The Berry Saunders mill has been optimised using computer modelling techniques to apply the ideal requirements to devitalise weed seeds using impact alone. However, there has been little concern for the airflow component of the power consumption. The rotor bars are narrow with sharp edges resulting in high drag coefficient and turbulence generation. The stator bars are orientated to result in torque converter or water brake dynamometer like turbulence generation and wasted heat generation.

One disadvantage of this approach is that the stator impact bars take up a lot of space radially. This in turns means that adjacent rows of rotating impact bars are spaced a long way apart. For a weed seed devitalisation mill, or a particle destruction mill for that matter impact speed is crucial. When impact bars are spaced widely apart the impact speed difference between each subsequent row is significant.

The above references to the background art do not constitute an admission that the art forms a part of the common general knowledge of a person of ordinary skill in the art. The above references are also not intended to limit the application of the method and system as disclosed herein.

SUMMARY OF THE DISCLOSURE

In a first aspect there is disclosed a multistage hammer mill comprising:

a plurality of milling stages arranged concentrically about each other; the plurality of milling stages arranged so that substantially all material in a first inner most of the milling stages passes through at least one subsequent adjacent milling stage, the plurality of milling stages including a first milling stage and a second milling stage, a central feed opening enabling material flow into a primary impact zone of the first milling stage;

the first milling stage comprising an impact mechanism and a first screen arrangement, the impact mechanism located in the primary impact zone and arranged to impact material entering the primary impact zone and accelerate the impacted material in a radial outward direction, the impact mechanism being capable of rotating about a rotation axis, the first screen arrangement disposed circumferentially about and radially spaced from the impact mechanism the first screen arrangement being provided with a plurality of apertures through which impacted material of a first size range can pass;

the second milling stage comprising a second arrangement disposed circumferentially about and radially spaced from the first screen arrangement, the second screen arrangement being provided with a plurality of apertures through impacted material of a second size range can pass, the second size range being the same as or different to the first size range, and one or more impact elements disposed between the first screen arrangement and the second screen arrangement, wherein material entering the second milling stage from the first milling stage is impacted and accelerated by the impact elements and pulverised against the screen arrangement.

In a second aspect there is disclosed a residue processing system for an agricultural machine having a power source with a power take off rotating about a first axis, the residue processing system comprising: at least one residue processing device each having a respective first drive shaft rotatable about a respective axis perpendicular to the first axis; a transmission system coupled between the PTO and each first drive shaft to change a direction of drive from the PTO to each first drive shaft and a belt drive arrangement coupled between the transmission system and each first drive shaft to transfer torque from the PTO to each first drive shaft.

In a third aspect there is disclosed a combine harvester comprising: a power take off (PTO) rotating about a power axis perpendicular to a direction of travel of the combine harvester; least one multistage hammermills according the first aspect, each hammer mill having at least a first drive shaft for imparting rotation to the impact mechanism of the respective hammer mills about respective axes perpendicular to the power axis;

a transmission system arranged to change a direction of drive from the PTO to each first drive shaft; and a belt drive arrangement coupled between the transmission system and each first drive shaft to transfer torque from the PTO to each first drive shaft.

BRIEF DESCRIPTION OF THE DRAWINGS

Notwithstanding any other forms which may fall within the scope of the hammer mill as set forth in the Summary, specific embodiments will now be described, by way of example only, with reference to the covering drawings in which:

FIG. 1 is an isometric view of an embodiment of the disclosed multi stage hammer mill;

FIG. 2 is a section view of the multi stage hammer mill shown in FIG. 1 taken in a radial plane;

FIG. 7a is a schematic representation of a residue processing system which includes two of residue processing devices that have two counter rotating components in a side-by-side juxtaposition;

FIG. 7b is a schematic representation of a drive belt arrangement used in the residue processing system shown in FIG. 7a;

FIG. 8b is a plan view of two hammer mills and the chopper utilised in the combine harvester shown in FIG. 8a;

FIG. 10b is a plan view of a drive belt arrangement used in the residue processing system shown in FIG. 10a;

FIG. 11a is a schematic representation of an embodiment of the residue processing system incorporating a modified drive system in comparison to that shown in FIG. 10a;

FIG. 11b is a plan view of a used in the residue processing system shown in FIG. 11a;

FIG. 12 is a schematic representation of a further drive belt arrangement having a pulley incorporating a fan which may be used in embodiments of the residue processing system;

FIG. 13b is a representation of the hammermills shown in FIG. 13a but with their respective covers on;

FIG. 15b is a plan view of the segment shown in FIG. 15a;

DETAILED DESCRIPTION OF SPECIFIC EMBODIMENTS

Figure 6:
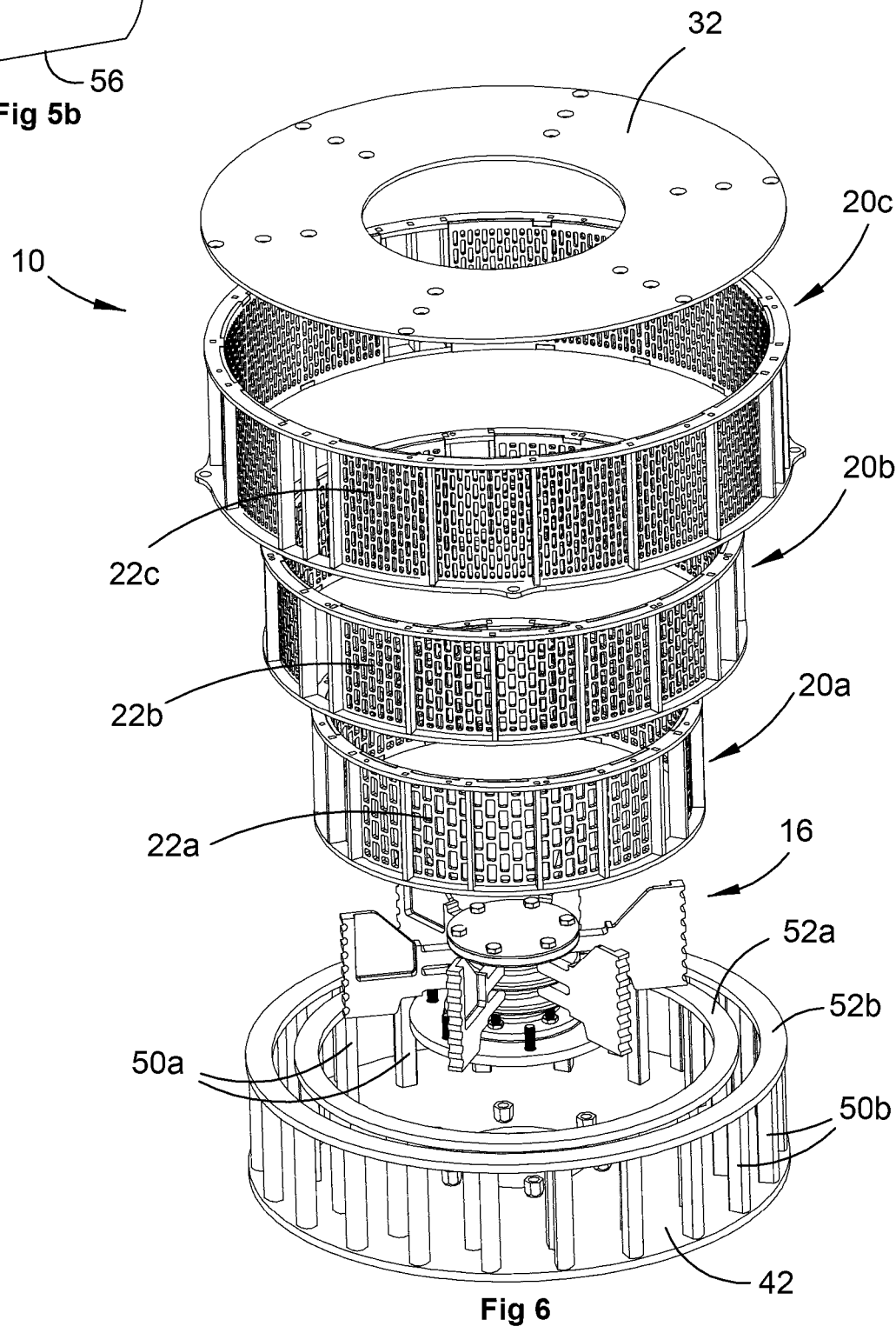
FIG. 6 is an exploded view of the disclosed multistage hammer mill.

FIGS. 1, 2 and 6 depict an embodiment of the disclosed multistage hammer mill 10 (hereinafter referred to in general "hammer mill 10"). The multistage hammer mill 10 has a central feed opening 12 enabling material flow into a primary impact or destruction zone 14. An impact mechanism 16 is located in the primary impact zone 14 and is capable of rotating about a rotation axis 18. The impact mechanism 16 is arranged to impact the material entering the primary impact zone 14 and accelerate the impacted material in a radial outward direction. The hammer mill 10 also has a first screen arrangement 20a and at least a second screen arrangement 20b. The first screen arrangement 20a is disposed circumferentially about the impact mechanism 16 and forms a boundary of the primary impact zone 14. The first screen arrangement 20a has a plurality of apertures 22a through which impacted material of a first size range can pass.

The second screen arrangement 20b is disposed circumferentially about and radially spaced from the first screen arrangement 20a. The second screen arrangement 20b has a plurality of apertures 22b through which impacted material of a second size range can pass. The second size range can be the same as or different to the first size range. However in the present illustrated embodiment the second size range is different to the first size range. In particular a lower size limit of the second range is smaller than a lower size limit for the first range. The provision of the first and second screen arrangements 20a and 20b characterised the hammer mill 10 as being a two-stage hammer mill.

In this particular embodiment the hammer mill 10 is also provided with an optional third screen arrangement 20c. The third screen arrangement is disposed circumferentially about and radially spaced from the second screen arrangement 20b. The third screen arrangement 20c has a plurality of apertures 22c through which impacted material of a third size range can pass. The third size range can be arranged to have a lower limit that is the same or smaller than the lower limit of the second size range, although in this particular embodiment the lower limit is smaller for the third size range than the second size range.

The hammer mill 10 when provided with the third screen arrangement 22c constitutes a three stage hammer mill.

In the following discussion of the hammer mill 10 the first, second and third are screen arrangements are referred to in general as "screen arrangements 20" and the apertures 22a, 22b and 22c are referred to in general as "apertures 22". The apertures 22 are of a generally rectangular in shape with rounded corners. As described above, the apertures 22 are of smaller size for the screen arrangements 20 with increased radius.

With particular reference to FIG. 2 it can be seen that the first screen arrangement 20a is formed with at least one (and in this particular embodiment three) openings or gaps 24a. The openings/gaps 24a are dimensioned to enable the passage of impacted material that is too large to otherwise pass through the apertures 22a in the screen 20a. This assists in minimising the build-up of oversized material within the primary impact zone 14 that may otherwise reduce the throughput of material through the hammer mill 10. For example this may include pieces of straw or other plant matter which is entrained in the material fed into the hammer mill 10 through the feed opening 12.

Likewise the second and third screen arrangements 20b and 20c may be provided with one or more (and this embodiment three) openings or gap 24b and 24c respectively to enable the passage of impacted material that is otherwise too large to pass through their respective apertures 22. The gaps 24 also enable the passage of hard materials such as stones to minimise the risk of damage to the respective screen arrangements 20.

The openings/gaps 24 of respective successive screen arrangements at least partially overlap in the circumferential direction. For example there is a circumferential overlap between the gaps 24a and 24b. Similarly there is a circumferential overlap between the gaps 24b and 24c.

When a screen arrangement 20 is formed with a plurality of openings/gaps 24 the openings/gaps 24 are evenly spaced circumferentially about the respective screen arrangement 20.

In this embodiment the arc length of the respective gaps 24 increases with increased radius from the rotation axis 18.

Each of the screen arrangements 20, at least when provided with two or more openings/gaps 24, may be formed from an identical number of screen segments 26. The openings 24 are formed by appropriately circumferentially spacing apart the respective segments 26. The number, spacing and relative position of the gaps 24 in mutually adjacent screen arrangements 20, can be varied by changing the number and arc length of the respective segments 26 which make up each screen arrangement 20. The relative position of the gaps 24 can also be varied by rotating the screen arrangements 20 relative to each other. Varying the position of the gaps 24 between adjacent screen arrangements 20 can effectively vary the maximum rotation of material about the respective screen arrangement prior to exiting to the next screen arrangement/stage.

A plurality of axially extending supporting ribs 28 is provided immediately behind each of the screen arrangements 20 in the radial direction. The ribs 28 are evenly spaced circumferentially about the respective screen arrangements 20. The ribs 28 on a trailing side of each opening 24 with reference to the direction of rotation of the impact mechanism 16 may act as impact ribs 28i for material passing from one milling stage to the next. The impact ribs 28i also assist in slowing down hard materials flowing through the openings 24.

Optionally for the third screen arrangement 20c at least one rib 28g is placed in each of the gaps 24c. The ribs 28g have the same shape and configuration as ribs 28 but acts as an impact bar for particles travelling through the opening 24c. The spacing of the rib 28g can increase with each outward screen arrangement and still provide effective impact for fragmenting material passing through the gaps 24c due to the increase in the tangential component of velocity relative to the radial component with increased radial distance from the rotation axis 18. Evenly spacing the ribs 28g in the gaps 24c minimises the chance of material missing the ribs 28g. In addition to improving efficiency of fragmentation of the material, when the screen arrangements 20 are stationary, the ribs 28g assist in decelerating hard materials that may be entrained in the flow. This further reduces the likelihood of damage to the mill 10. Also, in this regard the ribs 28g may be sacrificial to the extent that they are damaged in preference to the screen arrangement 20.

Figure 3:
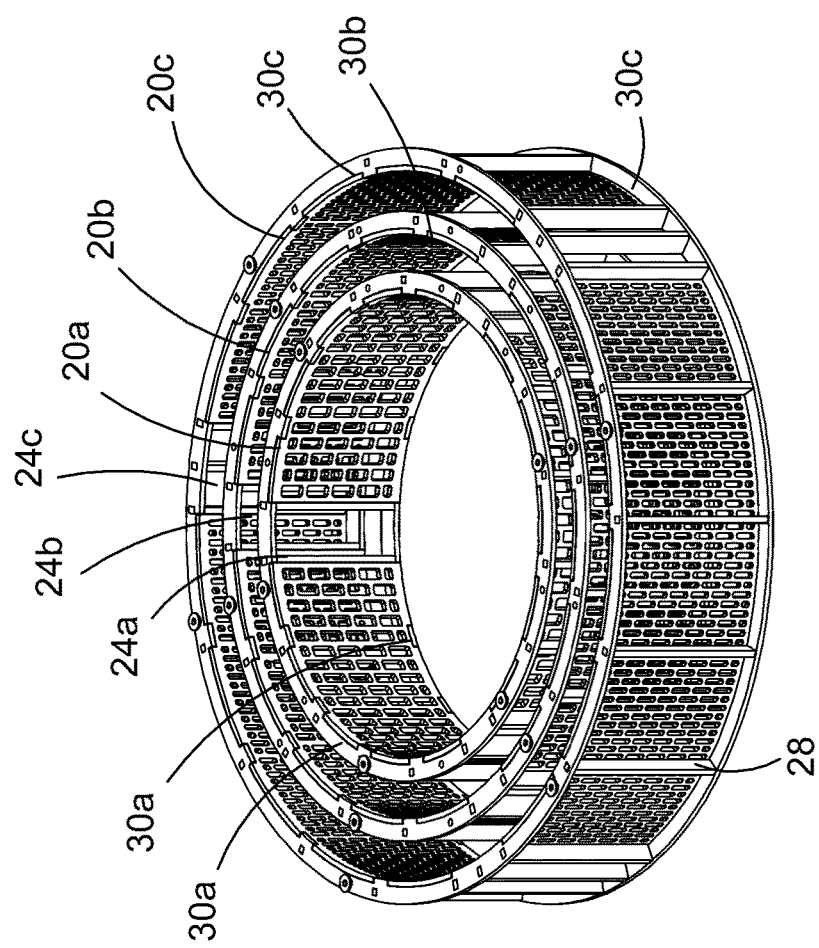
FIG. 3 is an isometric view of an arrangement of screens utilised in the embodiment of the multistage hammer mill shown in FIGS. 1 and 2.

With particular reference to FIG. 3 the axially opposite ends of the screen segments 26 of screen arrangement 20a are attached to the upper and lower rings 30a. The axially opposite ends of the screen segments 26 for screen arrangement 20b are attached to the upper and lower rings 30b. The axially opposite ends of the screen segments 26 for screen arrangement 20c are attached to the upper and lower rings 30c.

Figure 4:
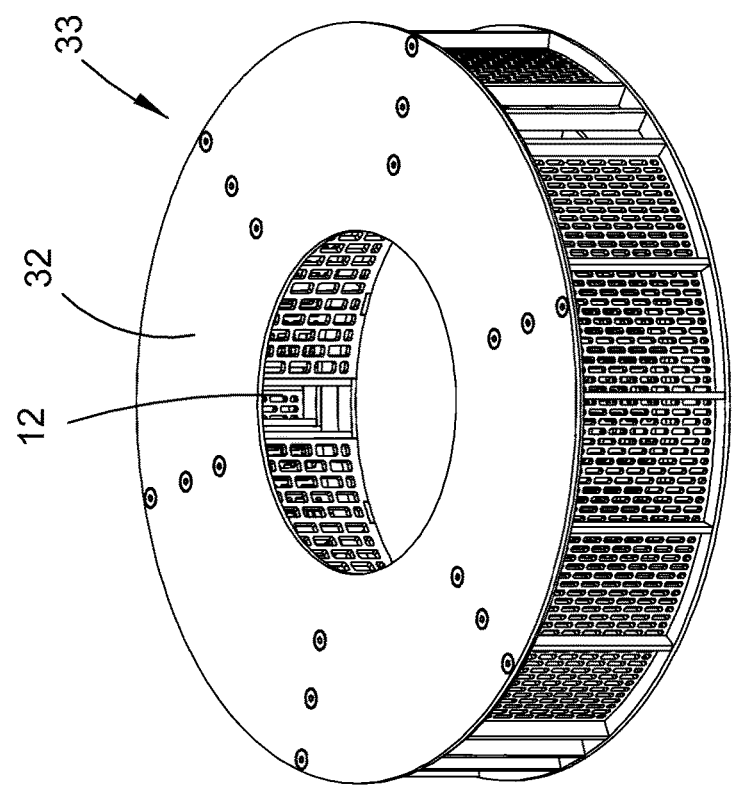
FIG. 4 is an isometric view of a screen structure which comprises the arrangement of screens shown in FIG. 3 coupled together with an inlet plate.

The screen arrangements 20 are fixed relative to each other by coupling to a common upper annular plate 32 shown in FIGS. 1 and 4. This forms a screen structure 33. The annular plate 32 is formed with a central opening which constitutes the feed opening 12.

The radius of the feed opening 12 is smaller than the radius of the first (i.e. inner most) screen arrangement 20a. This dimensional relationship facilitates acceleration of air and material in the radial outward direction as it enters the primary impact zone 14.

Figure 5A:
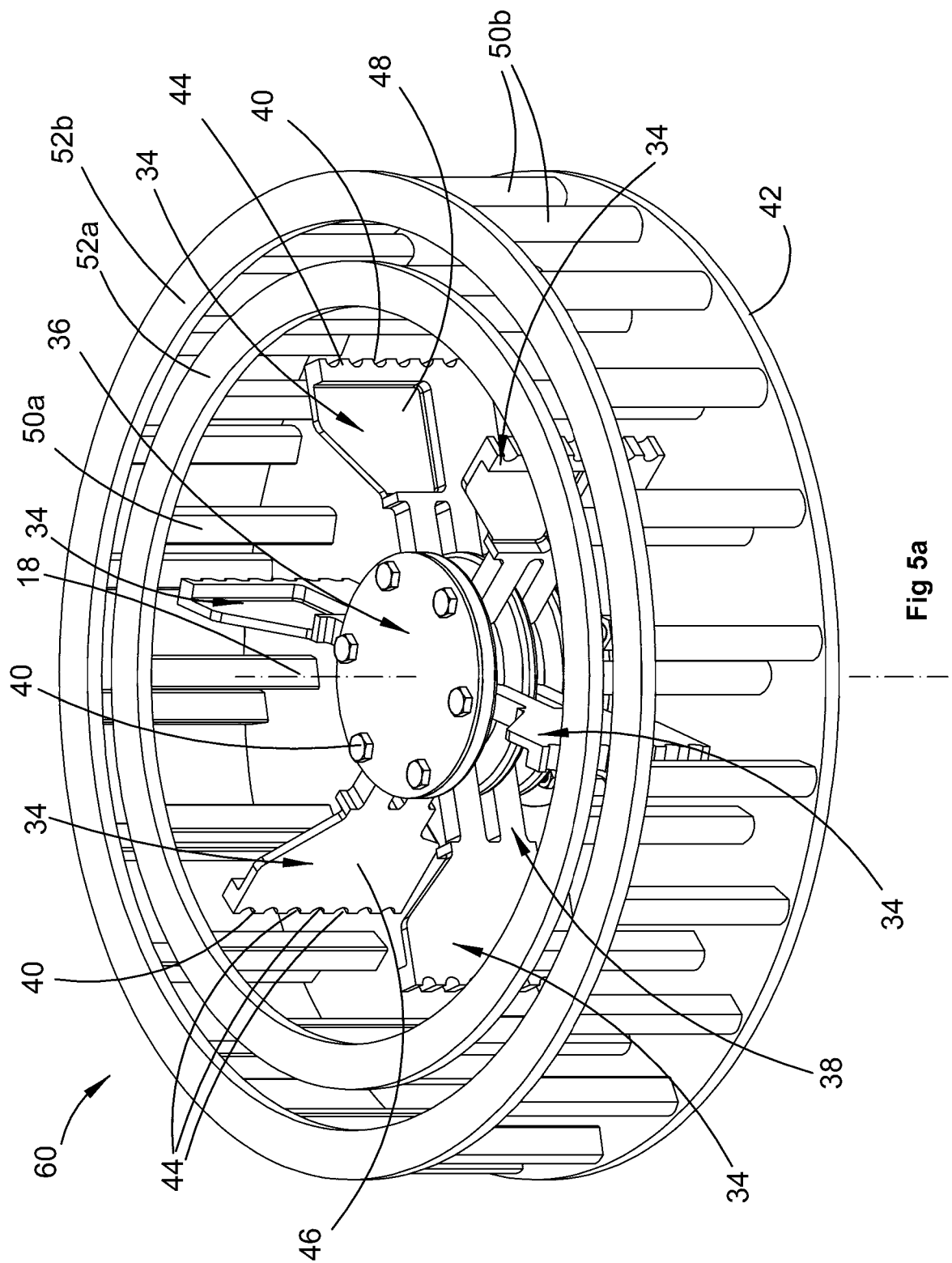
FIG. 5*a* is an isometric view of a central impact mechanism and an arrangement of impact elements incorporated in an embodiment of the disclosed multistage hammer mill.

Referring particular to FIGS. 2 and 5a the impact mechanism 16 is provided with a plurality (in this instance six) radially extending flails or hammers 34. Each hammer 34 is coupled to a common central hub 36 which rotates about the rotation axis 18. The hammers 34 are provided with bifurcated arms 38 which are pivotally coupled about respective bolts or pins 40 to the hub 36. This enables the hammers 34 to swing if impacted by a hard foreign object which enters the impact zone 14 to minimise the likelihood of major damage. A hard foreign object, if not fragmented into pieces small enough to pass through the apertures 22, will eventually exit through the gaps 24.

Each hammer 34 has an outer axial edge 40 which extends for a length marginally smaller than the depth of the impact zone 14. This enables the provision of a small clearance between the upper and lower radial edges of the hammers 34 and the annular plate 32 and bottom surface of the impact zone 14.

The axial edge 40 is formed with a plurality of spaced apart grooves of flutes 44 the purpose of which is to assist in fragmenting elongated material such as straw that may enter the feed opening 12 as well as reduce smearing of material on the screen arrangement 20a. An impact side 46 of the hammers 34 is substantially planar and lies in the axial plane. A trailing face 48 of the hammers is scalloped. The purpose of this is to balance the impact mechanism 16 any radial plane. In this regard the hammers 34 extend in an axial direction higher than the hub 36. In the absence of the scalloping the centre of gravity of the impact hammers 34 would be axially offset from the centre of gravity of the hub 36 which may lead to instability together with increased bearing wear and heat generation.

The combination of the impact mechanism 16 and the screen arrangement 20a forms a first milling stage of the multistage hammer mill 10.

As can be seen from FIGS. 2 and 5a embodiments of the hammer mill 10 are provided with a first plurality of impact elements 50a disposed between the screen arrangements 20a and 20b. The combination of the first plurality of impact elements 50a and the second screen arrangement 20b forms a second milling stage of the multistage hammer 10.

A second plurality of impact elements 50b is disposed between the screen arrangements 20b and 20c. The combination of the second plurality of impact elements 50b and the third screen arrangement 20c forms a third milling stage of the multistage hammer 10.

The impact elements 50a, 50b (hereinafter referred to in general as "impact elements 50") between mutually adjacent screen arrangements are evenly spaced apart in the circumferential direction thus forming corresponding circular arrays of impacts elements.

A lower end of each of the impact elements 50 is fixed a base plate 42. An upper end of each of the impact elements 50a is attached to a ring 52a, while the upper end of each of the impact elements 50b is attached to a concentric ring 52b. The base plate 42 also forms the bottom surface of the impact zone 14.

Figure 5B:
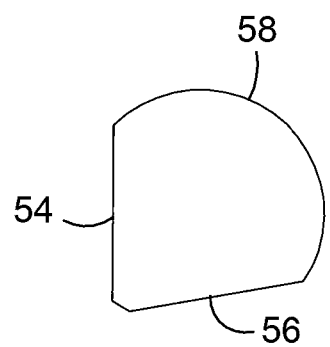
FIG. 5*b* is an enlarged section view of an impact elements incorporated in the disclosed hammer mill.

As shown on FIGS. 2 and 5b, each impact element 50 has a first flat surface 54 that lies parallel to the radial direction of the mill 10. However in other embodiments the first flat face 54 may lie within 20 degrees to a radial direction of the multistage hammermill. Each impact element 50 also has on its radial inner side a second flat face 56 that joins, and forms an acute included angle with, the flat surface 54. A curved (i.e. non-linear) surface 58 extends between the flat faces 54 and 56.

The hub 36 and thus the central impact mechanism 16 are fixed to the base plate 42. Thus the impact mechanism 16 and the impact elements 50 a driven together. When the impact elements are rotating about the rotation axis 18 the first flat face 54 is a leading face of the impact element 50 and provides for improved impact speeds. The curved surface 58 is a trailing surface and assists in reducing drag and turbulence. The second flat face 56 being at the acute angle relative to the first flat face 54 minimises sidewall impact of material moving radially outward's. This assists in improving airflow and chaff flow capacity.

The entire assembly of the base plate 42, impact elements 50 and impact mechanism 16 may form a replaceable unit. Additionally the flails 34 can be individually replaced by decoupling from the central hub 36. Also individual impact elements 50 or separate complete arrays of arrays of impact elements 50 may be replaceable.

The combination of the impact mechanism 16 and the impact elements 50 which are both attached to the base plate 42 forms a rotor structure 60. The screen structure 33 inter-fits with the rotor structure 60 in a manner so that the annular plate 32 overlies the rings 52a, 50b and the base plate 42; the first screen arrangement 20a locates between the hammers 34 and impact elements 50a; the second screen arrangement 20b interposes between the impact elements 50a and 50b; and the third screen arrangement 20c surrounds the impact elements 50b. A housing (shown in FIG. 13b) extends about the outer most screen arrangement 20 and is used to convert the pressure generated by the rotor into velocity at the exit. A discharge opening is formed in the housing. Material exits the multistage hammer mill through the discharge opening and is spread by the air flow generated initially by rotor structure 60 in particular the impact mechanism 16.

If desired the screen structure 33 can also be driven to rotate about the rotation axis 18. The screen structure 33 can be rotated in the same direction or in an opposite direction to the impact mechanism 16/rotor structure 60.

The general operation of the multistage hammer mill 10 is as follows. Material enters through the feed opening 12 and flows in the radial direction by airflow generated by the impact mechanism 16. While in the primary impact zone 14 the material is accelerated by the hammers 34 and undergoes sheer, crushing, impact and attrition forces between the screen arrangement 20a and the hammers 34 multiple times. If the material is small enough to pass through the apertures 22a it passes to the next (second) milling stage constituted by the impact elements 50a and the second screen arrangement 20b. However, if the material isn't small enough, it has a maximum of approximately ⅓ rotation of the mill to reach an opening 24a where it subsequently passes to the second milling stage. In this way, over processing of material is prevented in an application where capacity is very important. As previously described above the number and/or relative position of the openings 24 can be adjusted to vary the maximum rotation.

Material in the second milling stage is impacted and accelerated by the impact elements 50a and pulverised against the screen arrangement 20b. Material that is small enough to pass through the apertures 22b enters the next (third) milling stage constituted by the impact elements 50b and the third screen arrangement 20c. Material that is not small enough passes into the third stage through an opening 24b.

Material in the third stage is impacted and accelerated by the impact elements 50b and pulverised against the screen arrangement 20c. Material that is small enough to pass through the apertures 22c enters a discharge chamber formed between the housing and the third screen arrangement 20c. Airflow in the discharge chamber exits together with entrained milled material through the discharge opening.

Embodiments of the disclosed multistage hammer mill have an advantage over traditional hammermills because reducing the screen size with each row allows smaller particles passing through quickly to the next stage. This reduces the amount of over pulverising on each row to improve the overall capacity of the mill for a given size.

Embodiments of the disclosed hammermill approach are believed to have an advantage over the Berry Saunders mill by virtue of the screen arrangements 20 enabling control over particle size. In particular screen arrangements 20 of different aperture 22 sizes can be interchanged to facilitate adjustment to target different weed species. Additionally, the screen arrangements 20 are radially narrow and therefore rotating impact elements 50 can be close together radially and operate at similar tip speeds. It is believed that the impact elements operating at similar tip speeds improve seed kill effectiveness and energy efficiency. Additionally, the multistage hammer mill is able to provide shear, crushing and attrition to material for more effective processing of fibrous crop materials.

In one embodiment the output airflow and chaff material can be used to assist the spread of a straw chopper by directing onto the chopper tailboard, which has either stationary vanes or rotating spinners or otherwise to spread the residue material.

In another embodiment the output of the material from the disclosed mill can be directed into a straw chopper itself. By combining chopper and the multistage hammermill air flows the overall performance can be improved. For example the chopper and multistage hammermills will require a certain amount of air flow operating individually to process and distribute residue material. By operating in series, this amount of air flow pumping could be reduced and still be able to process and distribute material effectively. This could be achieved by reducing the air flow effect of either or both of the chopper and impact mill.

FIGS. 7a and 7b illustrates a part of a residue processing system 80 which comprises at least one but in this case two multistage hammer mills 10a and 10b in a side-by-side juxtaposition. The residue destruction system 80 may also include a chopper (not shown) arranged relative to the hammer mills as described above. The hammer mills 10a and 10b (hereinafter referred to in general as "hammer mills 10") in this embodiment are of the same structure and design as the hammer mill 10.

The residue processing system 80 includes a drive system 82 for driving the hammer mills 10. The drive system 82 has a main pulley 84 for driving a first belt 86 and a second belt 88. The first belt 86 runs about an idler 90, a drive pulley 92a and a drive pulley 92b. An outer surface of the belt 86 drives the pulley 92a while an inner side of the belt 86 drives the pulley 92b. As a consequence the pulleys 92a and 92b rotate in mutually opposite directions. The pulley 92a imparts torque to a drive shaft 93a of the impact mechanism 16 and the corresponding rotor structure 60 of the mill 10a. The pulley 92*b* imparts torque to a drive shaft 93*b* the impact mechanism 16 and the corresponding rotor structure 60 of the mill 10*b*.

The second belt 88 runs about an idler 94 and drive pulleys 96*a* and 96*b*. An outer surface of the belt 88 drives the pulley 96*b* while an inner side of belt 88 drives the pulley 96*a*. Accordingly the pulleys 96*a* and 96*b* rotate in mutually opposite directions. The pulley 96*a* imparts torque to a drive shaft 95*a* of the screen structure 33 of the mill 10*a* while the pulley 92*b* imparts torque to a drive shaft 95*b* the screen structure 33 of the mill 10*b*.

It should be recognised that the pulleys 92*a* and 96*a* rotate in mutually opposite directions; as do the pulleys 92*b* and 96*b*. Thus the drive system 82 operates to drive the rotor structures 60 and screen structures 33 for each hammer mill 10 in mutually opposite directions.

The main pulley 84 is coupled to a transmission system 98. In the present illustrated embodiment the transmission system 98 comprises a pulley 100 which is coupled by shaft 102 to a gearbox 104 which has an output shaft 106 that drives the pulley 84. The pulley 100 is driven by a belt 108 which receives power from a power source (not shown) that drives the belt 108 about a power axis that is perpendicular to the shaft 106 and to the rotation axes of the shafts 93*a*, 93*b*, 95*a* and 95*b*. The use of drive belts 86 and 88 to impart torque to the hammer mills 10 assists in reducing shock loads on the gearbox 104.

Figure 8A:
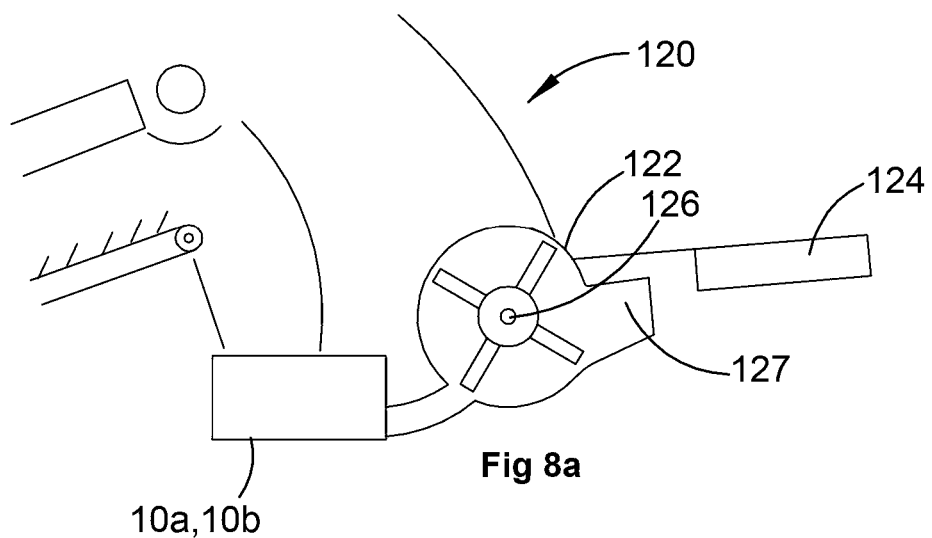
FIG. 8a is a schematic representation of a rear portion of a combine harvester incorporating an embodiment of the disclosed residue processing system which directs processed material into a straw chopping device of the harvester.
Figure 8B:
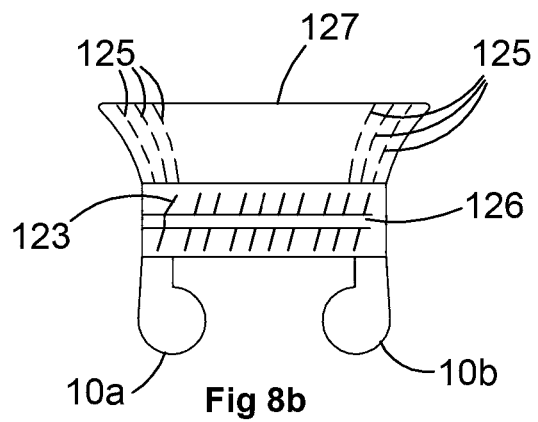

The residue processing system 80 may be part of an agricultural machine such as but not limited to a combine harvester. FIGS. 8*a* and 8*b* are schematic representations of a rear portion of a combine harvester 120 depicting a chopper 122 with radial chopper blades 123, a tailboard 124 and fitted with two multistage hammer mills 10*a* and 10*b* (hereinafter referred to in general as "hammer mills 10"). The chopper 122 is driven to rotate about an axis 126 which is parallel to a power take off shaft (not shown) of the combine harvester 120. The power take off shaft extends in a direction perpendicular to the direction of travel of the combine harvester 120.

The hammer mills 10 are driven by the drive system 82 which is also powered by the power take off shaft of the combine harvester 120. Specifically the belt 108 is engaged with a pulley (not shown) mounted on the power take off shaft. It should be appreciated here that the hammer mills 10 are mounted in a manner so that their respective impact mechanisms 16 are rotated about axes that are perpendicular to the power take off shaft and the axis 126. In the arrangement shown in FIGS. 8*a* and 8*b* mills 10 are arranged so that their discharge flow is directed or otherwise fed into the chopper 122. Thus the airflow of the hammer mills 10 is added to the airflow of the chopper 122 which may provide a synergistic effect. More particularly the airflow from the hammer mills 10 may be added to the respective axial end regions of the chopper 122. This may assist in providing greater sideways or lateral spreading of the material from the chopper 122. This effect may be further enhanced by installing curved blades or fins 125 in an outlet chute 127 of the chopper 122 at least near or adjacent its axial end regions.

Figure 9:
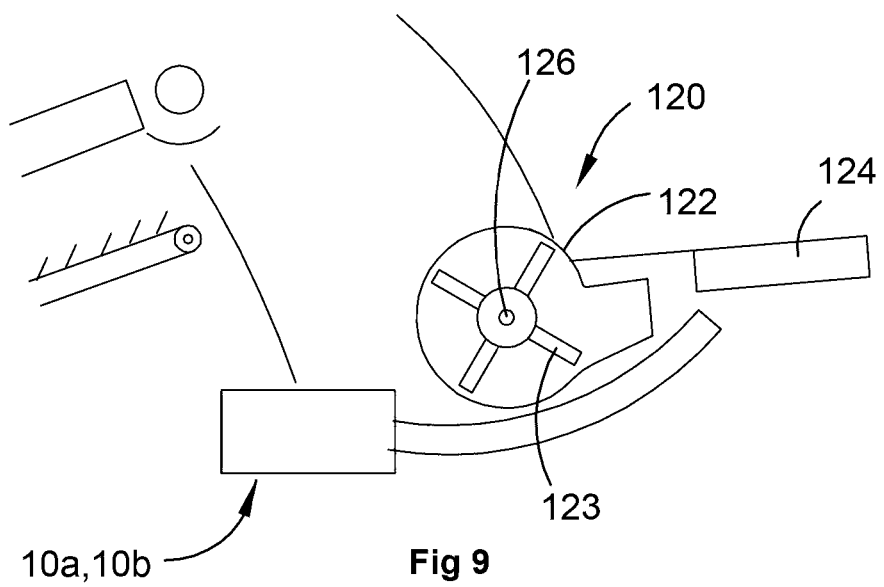
FIG. 9 is a schematic representation of a rear portion of a combine harvester incorporating an alternate embodiment of the disclosed residue processing system which directs processed material directly onto a tailboard for spreading chaff and straw material.

In the arrangement shown in FIG. 9 the discharge flow from the hammer mills 10 is directed onto the tailboard 124 of the chopper 122 to assist in spreading their respective discharged processed materials.

Figure 10A:
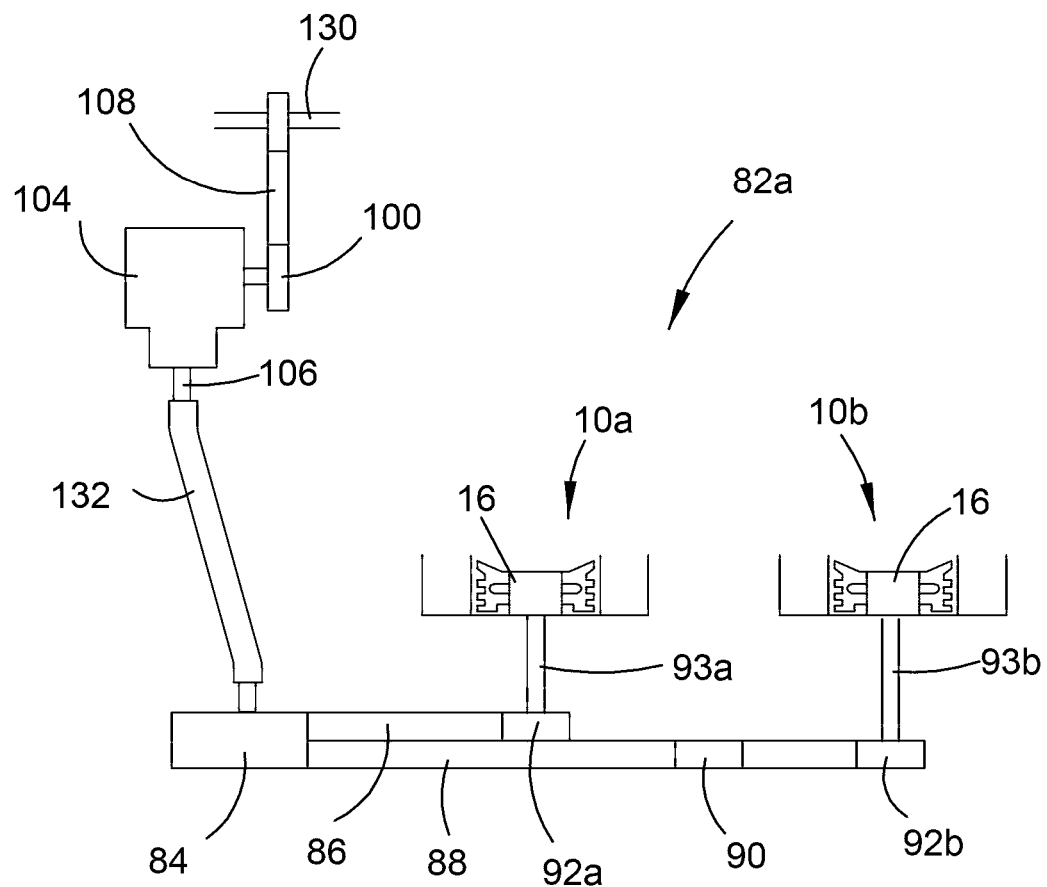
FIG. 10a is a schematic representation of an embodiment of the residue processing system incorporating a drive system for a residue processing device that has two devices with one rotating component each.
Figure 10B:
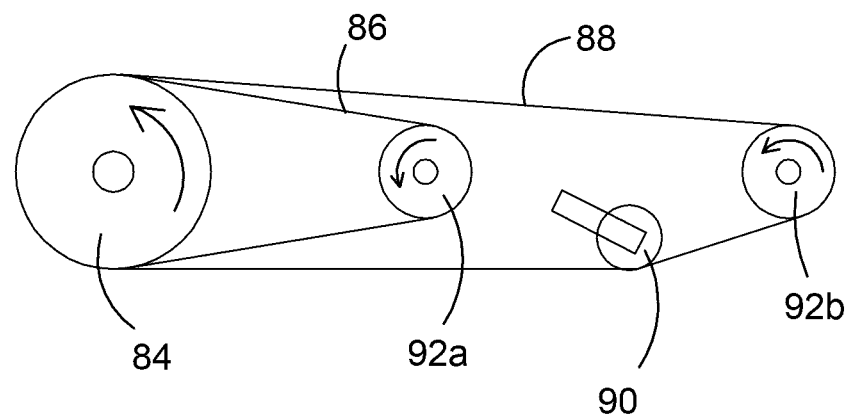

FIGS. 10*a* and 10*b* show an alternative form of drive system 82*a* for transferring drive from a power take off shaft 130 of the combine harvester 120 to the hammer mills 10*a* and 10*b*. In these Figures the same reference numbers are used to denote the same features as described for the system 82 shown in FIGS. 7*a* and 7*b*.

The drive system 82*a* has many similarities to the drive system 82 shown in FIGS. 7*a* and 7*b* in that it includes the gearbox 104 driven by the PTO 130 via the belt 108 and pulley 100; and the gear box 104 rotates a pulley 84 that drives the hammer mills 10*a* and 10*b*. However the drive system 82*a* also includes a PTO shaft 132 connected between the gear box driveshaft 106 and the drive pulley 84. The drive pulley 84 drives to belts 86 and 88. The belt 86 engages the pulley 92*a* to drive the driveshaft 93*a* for the impact mechanism of the mill 10*a*. The drive belt 88 engages the pulley 92*b* to drive the driveshaft 93*b* for the impact mechanism 16 of the mill 10*b*. An idler pulley 90 is provided to enable tension variation in the belt 88. By this arrangement the shafts 93*a* and 93*b* are driven in the same direction but the screen arrangements 20 of the mills 10 are not driven, rather they remain stationary.

Figure 11A:
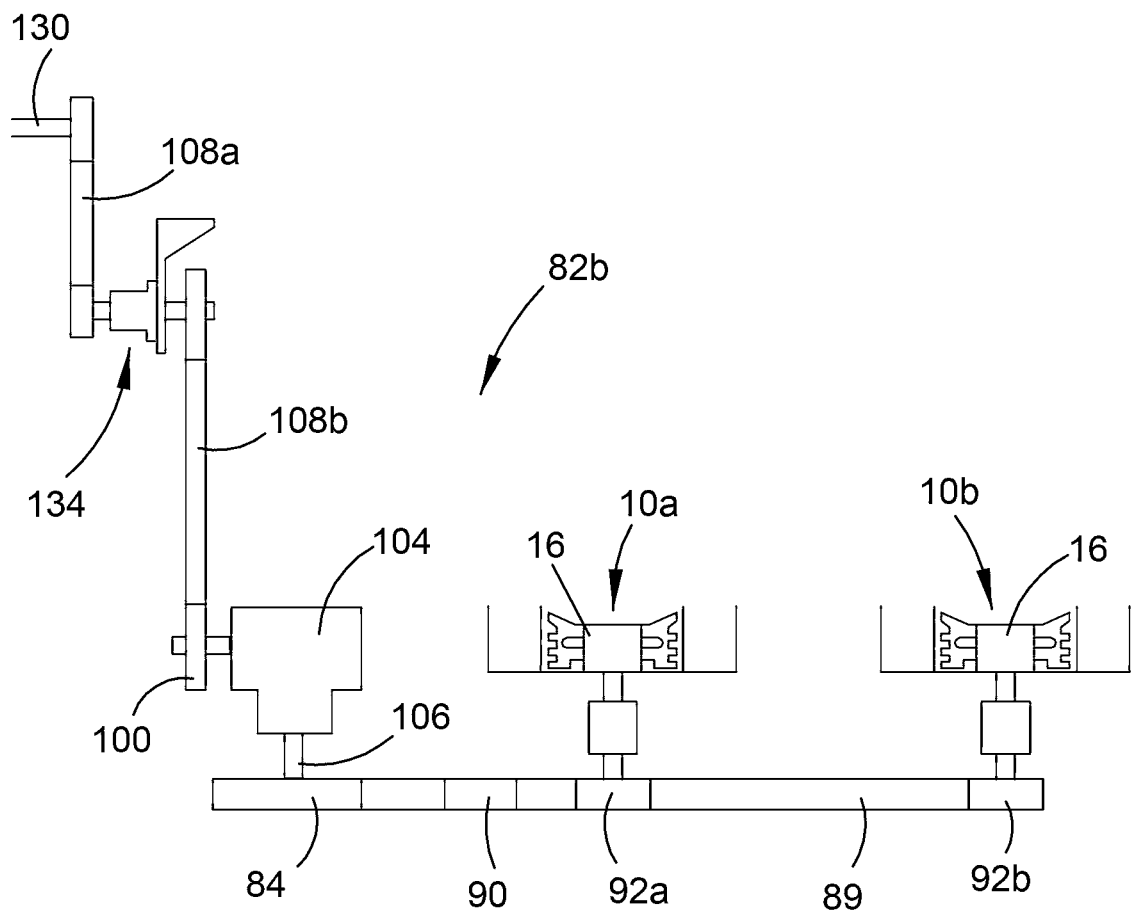
Figure 11B:
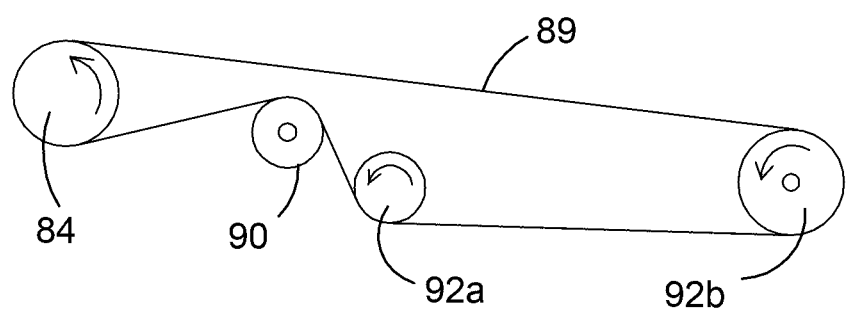

FIGS. 11*a* and 11*b* show yet a further variation of the drive system 82*b*, in which the same reference numbers are used to denote the same features of the drive system 82 shown in FIG. 10*a* and 10*b*. In the system 82*b* the impact mechanisms 16 of the hammer mills 10 are driven by a single belt 89 which engages the pulley 84, the idler pulley 90 and pulleys 92*a* and 92*b*. The gearbox 104 receives power from the harvester PTO 130 by a two belts 108*a* and 108*b* and an intervening jack shaft 134.

FIG. 12 shows a further drive system 82*c* which is somewhat of a hybrid between the system shown in FIGS. 10*a* and 11*a*. In the system 82*c* drivers received from a belt 108*b* (from FIG. 11*a*) to drive pulley 100 coupled to a gearbox (not visible in FIG. 12). The gearbox drives the pulley 84 to rotate about an axis perpendicular to that of the pulley 100. The pulley 84 drives belts 86 and 88. These belts engage with pulleys 92*a* and 92*b* of corresponding hammer mills 10. Due to the drive arrangement the hammer mills 10 are driven in the same direction as each other. Idler pullies 91 are provided for tensioning the belts 86 and 88.

In the drive system 82*c* a fan 140 is optionally incorporated in the pulley 84. The pulley 84 is formed with a belt engaging ring 142, a central hub 144 and a plurality of pitched fan blades 146 emanating from the hub 144 to the inside of the ring 142. In this way the pulley 84 acts as a cooling system for the gearbox to which it is connected. It should be appreciated that other pulleys described in earlier drive systems may also incorporate a similar fan to provide cooling to gearboxes or indeed other parts and components including the hammer mills 10 themselves. For example the pulleys 100 shown in FIGS. 7*a* and 10*a* can be formed with fans 100.

It will be also recognised that in each of the described residue processing systems 80, drive/torque from the PTO 130 is transmitted through 90° to rotate shafts 92, 93. The shafts 92 and 93 are shown extend in a vertical plane when mounted on a harvester 120, but could be slanted towards the front of the harvester or towards the rear of the harvester.

Figure 13A:
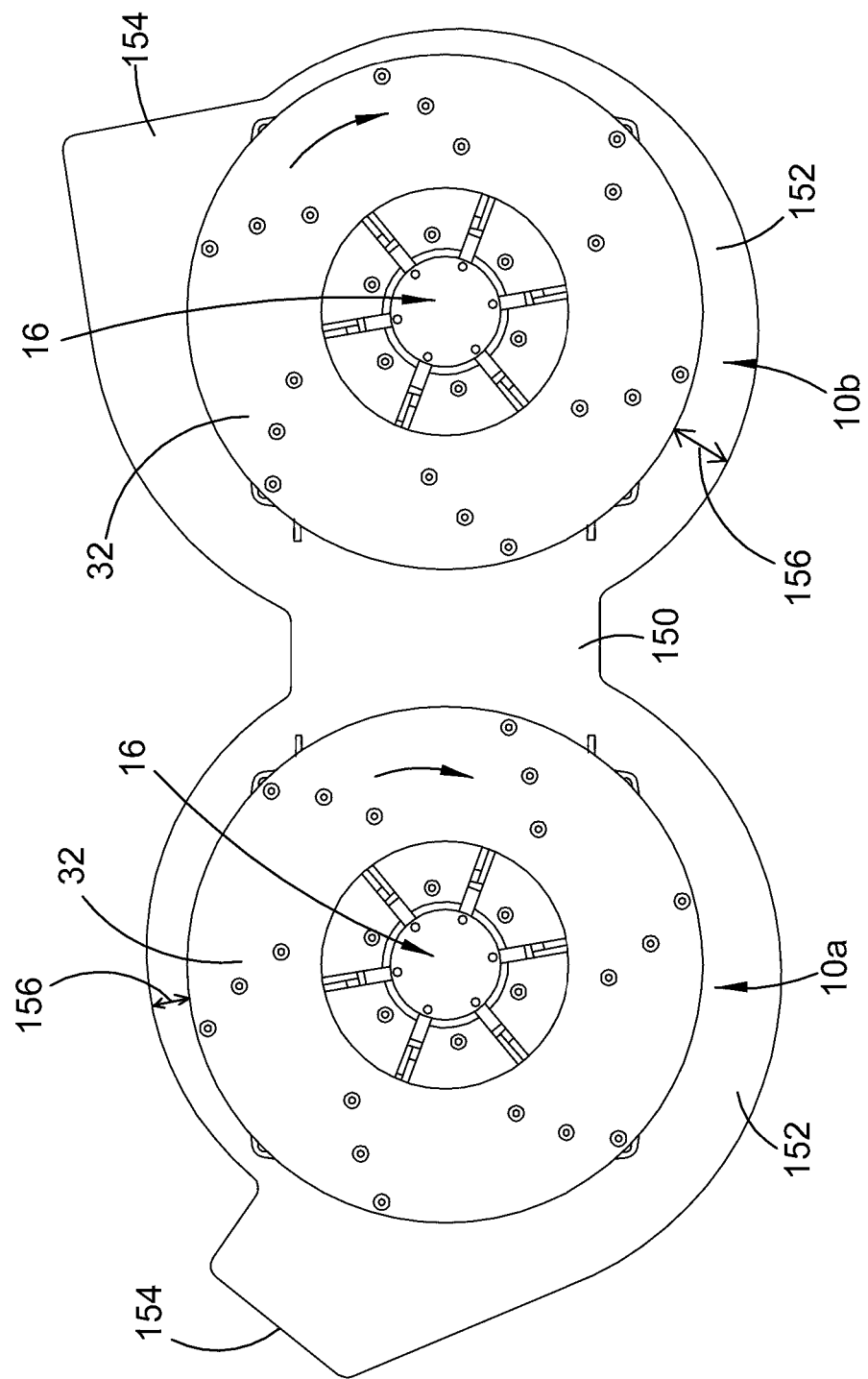
FIG. 13a is a schematic representation of a residue processing system having two of the disclosed hammermills juxtapose side-by-side and rotating in the same direction and with their respective covers off.
Figure 13B:
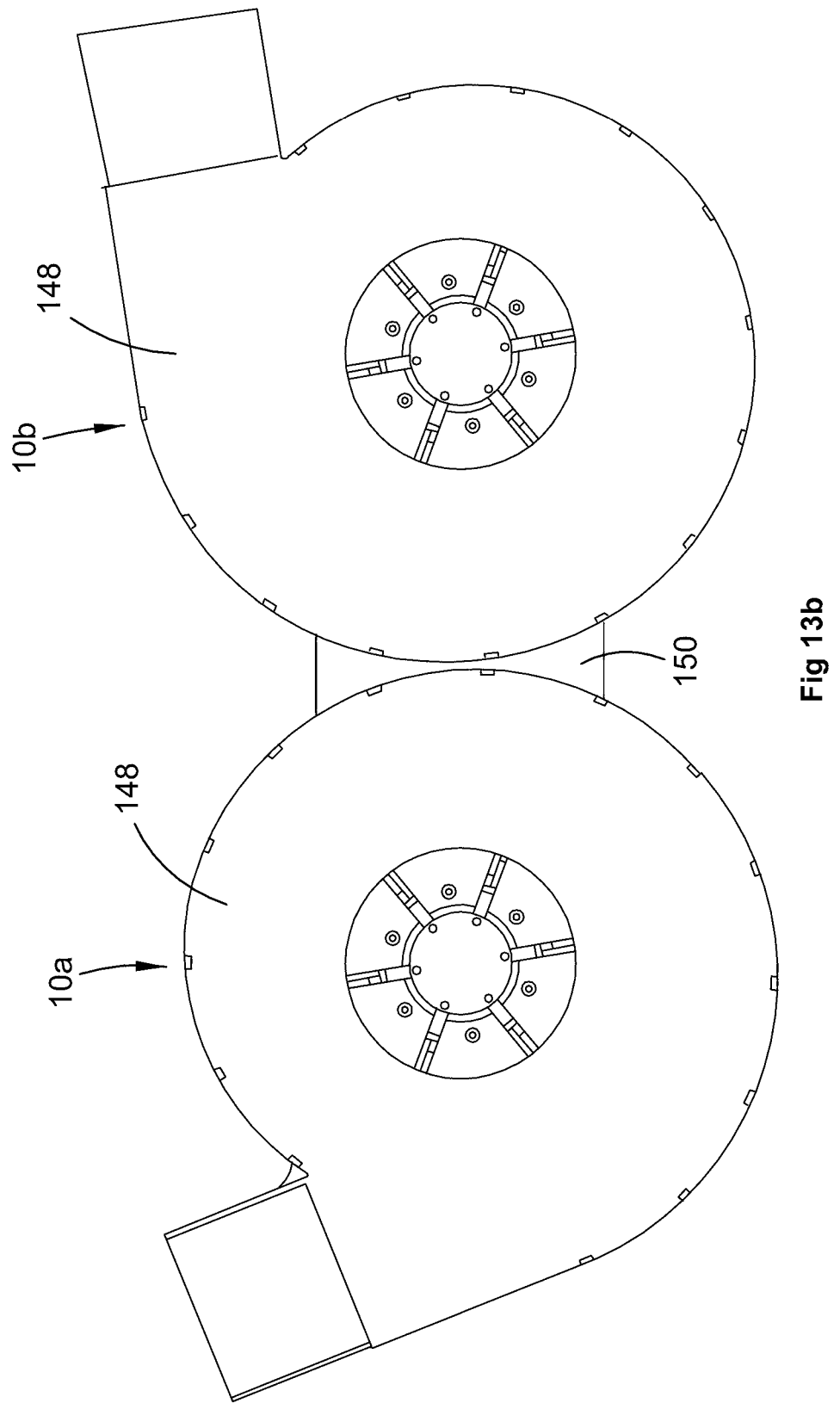

FIGS. 13*a* and 13*b* depict a possible orientation and juxtaposition of two hammer mills 10 when rotated in the same direction and mounted on a combine harvester. FIG. 13*a* shows the hammer mills 10 with their respective covers 148 on, while FIG. 13*b* shows the same arrangement but with the covers 148 off. Here both of the hammer mills 10, and more particularly the impact mechanisms 16 are rotated in a clockwise direction as indicated by the arrows drawn on the respective upper annular plates 32. The hammer mills 10 are mounted on a common base plate 150. Each base plate has a substantially circular portion 152 and an outlet portion 154. The hammer mills 10 are eccentrically mounted on the respective circular portions 152 so that a radial distance 156 between the outer peripheral radius of the hammer mills 10 and the edges of the circular portions 152 increases in the direction of rotation toward the outlet portion is 154. This assists in airflow through the hammer mills 10.

Whilst a number of specific embodiments of the mill and residue processing system have been described, it should be appreciated that the mill and system may be embodied in many other forms. For example the illustrated embodiment shows a three stage hammer mill with respective screen arrangements 20 each having apertures 22 of progressively smaller dimension with distance away from the rotation axis 18. However in one embodiment the size of the apertures 22 can be the same for all of the screen arrangements 20. Alternately the size the apertures 22 can be arranged so that the size stays the same or decreases with increased radius from the rotation axis 18 relative to the aperture size of a radially inward adjacent screen arrangement 20. In yet a further variation the orientation of the apertures may vary between respective screen arrangements. For example the apertures 22a may be of a rectangular shape having a major axis parallel to the rotation axis, while the apertures 22b may be of the same size and shape of apertures 22a but orientated so that their major axis is +45° to the rotation axis 18, and apertures 22c again of the same size and shape but orientated so that their major axis is −45° to the rotation axis 18.

In other variations the mill 10 may be formed with screen arrangements 20 that have either: no gaps 24; or one or more gaps in the inner most screen arrangement 20a and either no or one or more gaps in radially outer screen arrangements. Also, while the illustrated embodiment shows gaps 24 in successive screen arrangements 20 having some degree of overlap, in other embodiments the gaps in respective screen arrangements may be offset from each other so as to not overlap.

Figure 14:
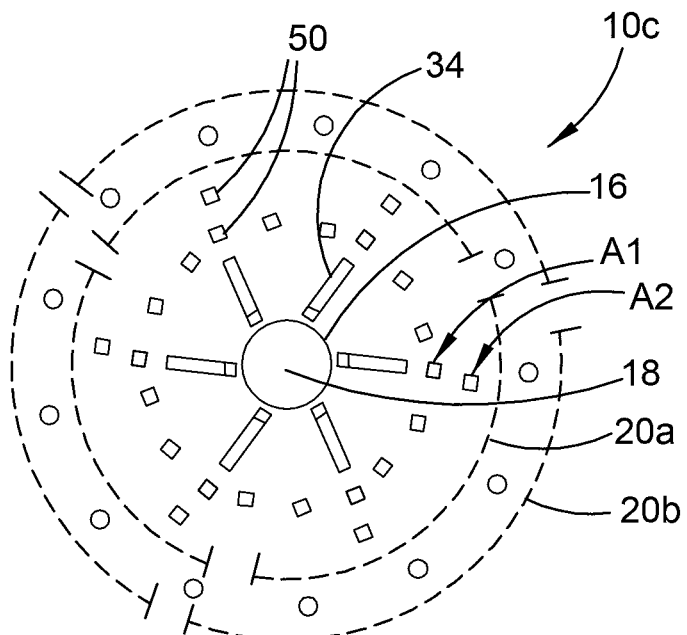
FIG. 14 is a schematic representation of a further embodiment of the multistage hammer mill.

In each of the illustrated embodiments of the hammer mill 10 the first screen arrangement 20a is radially adjacent the central impact mechanism 16 and associated flails/hammers 34. However this is not an essential requirement. One or more circumferential arrays of impact elements (for example similar to the impact elements 50) may be interposed between the impact mechanism 16 and the first screen arrangement 20a. This is exemplified in FIG. 14 which shows embodiment of the multistage hammer mill 10c having: an impact mechanism 16 with flails/hammers 34 rotatable about a rotation axis 18; a first screen arrangement 20a; a second screen arrangement 20b; and a first plurality of impact elements 50a is disposed between the screen arrangements 20a and 20b; as per each of the earlier described embodiments of the hammer mill 10. However the hammer mill 10c also includes two circumferential arrays A1 and A2 of impact elements 50. The radially inner array A1 of impact elements 50 may be: stationary; arranged to rotate in the same direction as the impact mechanism 16; or, arranged to rotate in an opposite direction to the impact mechanism 16. The radially outer array A2 of elements 50 may be arranged to rotate with the impact mechanism 16. In a modified form of the hammer mill 10c, the radial inner array A1 of impact elements 50 may be dispensed with so that the modified hammer mill 10c includes only the rotating array A2 interposed between the impact element 16 and the first screen arrangement 20a. In these embodiment the impact mechanism 18, the arrays of impact elements A1, A2 and the first screen arrangement 20a make up the first hammer mill stage.

Figure 15A:
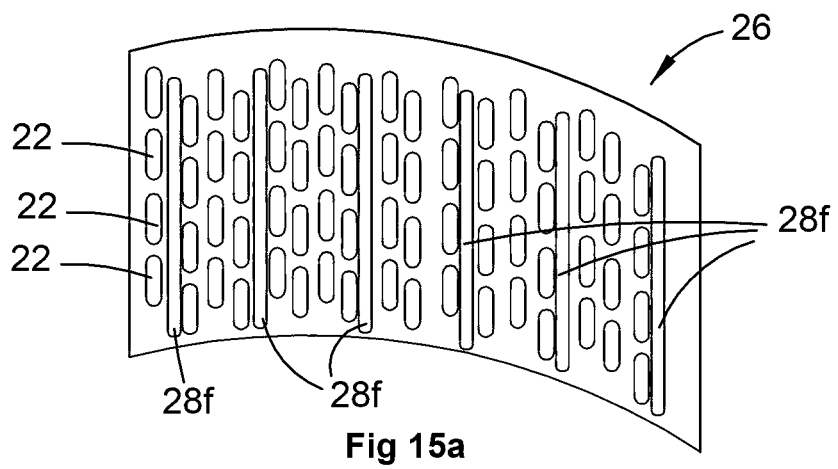
FIG. 15a is a schematic representation from the front of a segment of a screen arrangement provided with ribs on its radial inner surface which may be incorporated in embodiments of the disclosed multistage hammer mill.
Figure 15B:
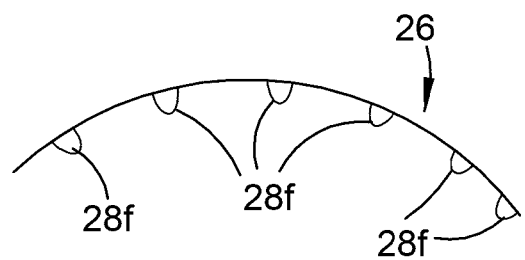

FIGS. 15a and 15b show further possible modification to the screen segments 26 which make up the respective screen arrangements 20. Here a plurality of ribs 28f is fixed to a radial inner side of the screen segments 26. The ribs 28f extend in the axial direction and are circumferentially spaced apart. Conveniently respective ribs 28f are located in the space between mutually adjacent columns of apertures 22. The addition of ribs 28f slow the material traveling around the screen arrangements 20, keeping the material in the impact zone for longer and thereby increasing the shear and impact forces on the material. Any one of the screen arrangements 20 can be provided with one or more of the ribs 28f.

Figure 16:
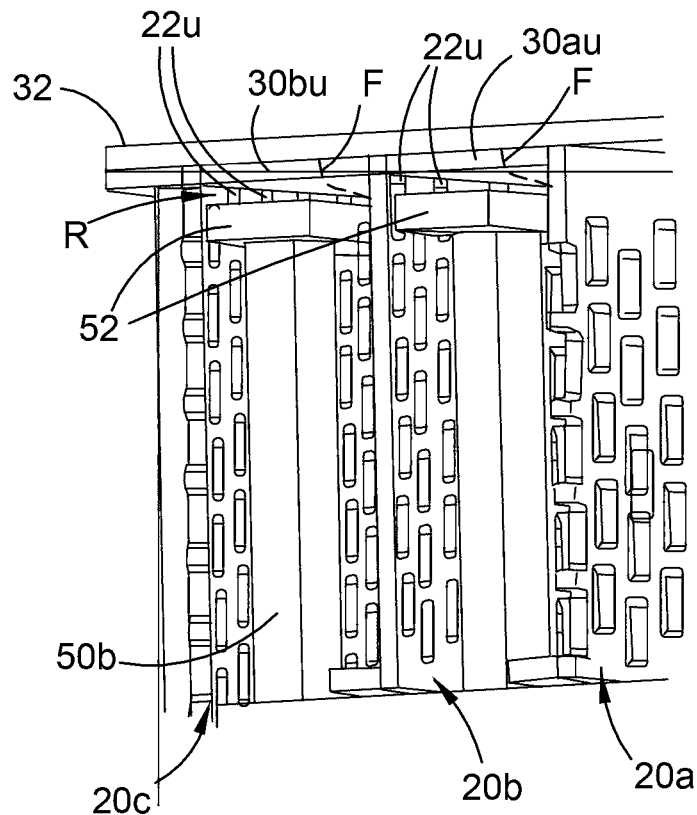
FIG. 16 is a schematic representation of an alternate construction of screen arrangement incorporated in the disclosed multistage hammer mill.

FIG. 16 illustrates a modified or alternate form of the screen arrangements 20a', 20b' and 20c' (hereinafter referred to in general as screen arrangements 20'). The substantive differences between the screen arrangements 20' and the screen arrangements 20 are as follows. In the screen arrangements 20' upper rings 30au, 30bu for the screen arrangements 20a', 20b' extend laterally from a radial outer side of the respective screen arrangements to a location close to (but not touching) a radial inner side of the screen arrangements 20b' and 20c' respectively. This avoids the creation of a substantial gap between the upper surface of the rings 52 and the inside surface of the annular plate 32. By way of comparison phantom line F in this Figure shows the location of the radial outer side of the upper rings 30b and 30c.

Additionally in screen arrangements 20' the apertures 22 include an uppermost row apertures 22u, for at least the second and third milling stages, that extend in the axial direction to at least an under surface of the upper rings 30au and 30bu. A benefit of this arrangement is that material located in a region R between the inside of the annular plate 32 and the rings 52 can pass through the apertures 22u to the next milling stage. This minimises the risk of material building up in the region R.

Figure 17:
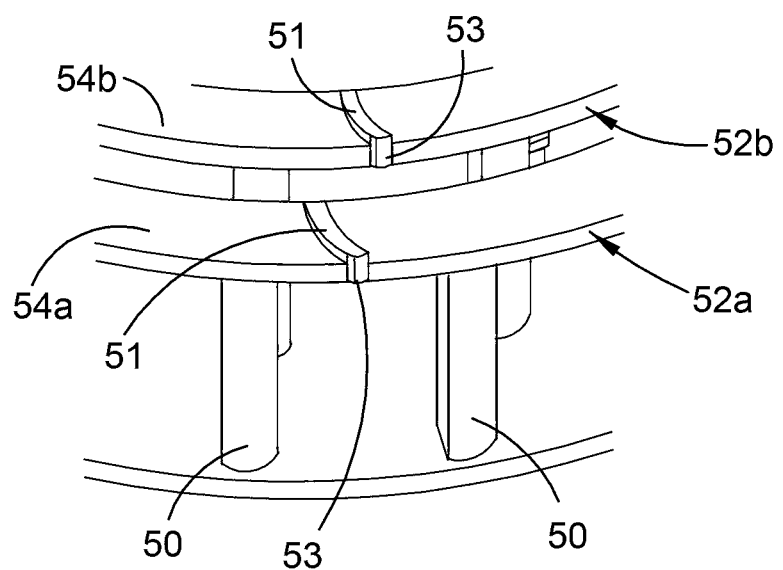
FIG. 17 is a schematic representation of axial and radial scrapers the may be provided on the rings used for supporting the upper ends of the impact elements together in an alternate embodiment of the disclosed multistage hammer mill.

FIG. 17 illustrates further possible variations of the disclosed hammer mill 10 in which axial and radial scrapers 51 and 53 respectively, are associated with the impact members 50. This association is by way of the scrappers being provided on the rings 52a and 52b of the corresponding circular array of impact members. The axial scrapers 51 are formed on the upper surfaces 54a and 54b of the corresponding rings. The scrapers 51 act to clear material in the regions R and assist in directing that material to pass through the apertures 22u. The scrapers 53 are formed on a radial outer circumferential edge of the rings 52a and 52b and extended to a location close to but not touching the adjacent screen arrangements 20, 20'. The purpose of the scrapers 53 is to also assist in directing material to pass through the apertures 22u. Moreover the scrapers 53 assist in preventing a build-up of material between the rings 52a, 52b and the adjacent screen arrangements.

Figure 18:
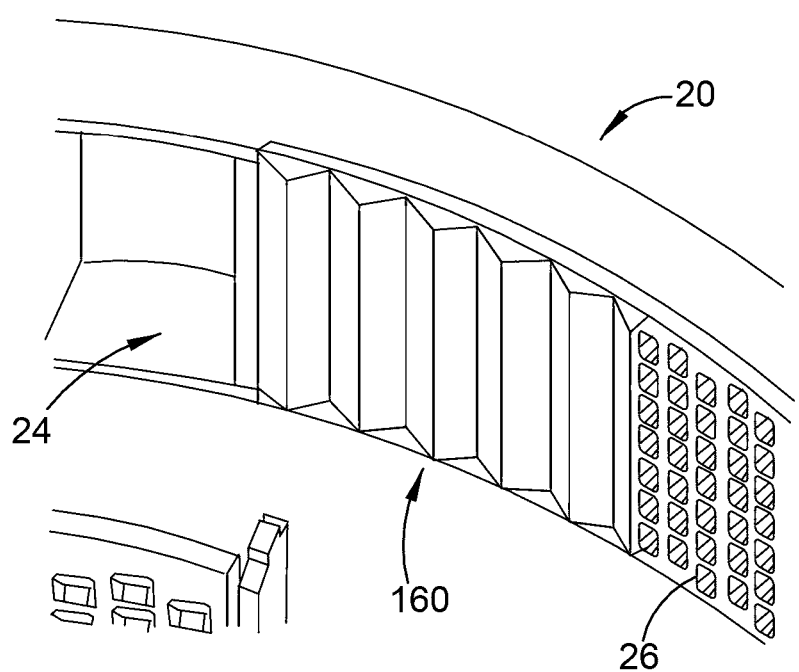
FIG. 18 is a schematic representation of a pulverising block which may be incorporated in alternate embodiments of the disclosed multistage hammer mill.

FIG. 18 shows another modification where a screen segment 26 adjacent one of the openings 24 of a screen arrangement 20 is replaced with a pulverising block 160. The pulverising block 160 has a solid front face formed with a sawtooth like profile. The block 160 provides an additional grinding and crushing zone within a milling stage. More than one block 160 can be incorporated in each milling stage. For example one screen segment 26 immediately adjacent an opening 24 could be replaced with a block 160. For a screen arrangement having three openings 24 there would then be three blocks 160. Ideally each block 160 would be on a leading side of the opening 24 with reference to the direction of rotation of the corresponding impact elements 50.

Figure 19:
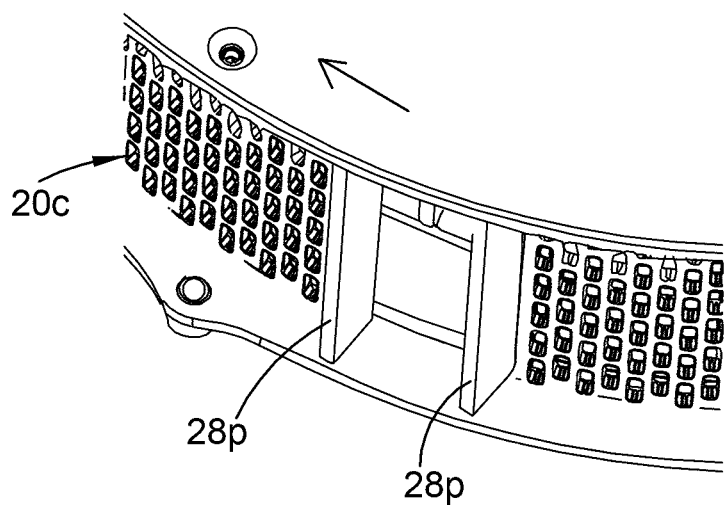
FIG. 19 is a schematic representation of flow guide plates that may be incorporated in alternate embodiments of the disclosed multistage hammer mill.

FIG. 19 shows is a further slight modification or variation in which the ribs 28 that would otherwise be on adjacent sides of an openings 24 are replaced with plates 28*p* that are angled in the direction of rotation of the impact mechanism 16 and impact elements 50. This would serve to increase the velocity of material and air exiting the screen arrangement for increased capacity. This may be particularly beneficial for the outermost milling zone/screen arrangement 20.

In a further variation the cross sectional shape of the impact elements 50 may be varied for that specifically shown in FIGS. 2 and 5*a* and 5*b*. For example the impact elements 50 may have a simple circular cross-sectional shape.

Embodiments of the disclosed multistage hammer mill 10 have a minimum of two milling stages. The embodiment described and illustrated in the present drawings is provided with an optional third milling stage. It should be understood however that additional milling stages can be sequentially added with increased radius from the rotation axis 18, each additional milling stage comprising a screen arrangement 20 and an array of impact elements 50. It is also possible in one embodiment for the milling stages to be arranged so that material milled in the first milling stage passes through at least one subsequent adjacent milling stage, or alternately through all of subsequent milling stages.

As previously described the provision of the openings 24 in the screen arrangements 20 is an optional feature. In one variation an embodiment of the hammer mill 10 may be formed in which the first milling stage is formed with no openings 24 in the first screen arrangement 20*a*. In this way hard materials are prevented from passing through sequential milling stages and into possible other mechanisms in a harvester such as a chopper. In such a variation the hammer mill 10 may also be provided with one or more sensors and an alarm to notify an operator of the existence of hard materials circulating within the first milling stage.

Weed seeds and crop residue material have varying properties. The amount of destruction (i.e. crushing, shearing, impact and attrition) needed depends on the seeds being targeted and the residue material that is being processed. Embodiments of the disclosed multistage hammer mill 10 enable the degree of destruction of residue material to be increased by:

1) increasing the relative rotational speed to increase impact and shear forces;

2) reducing the size of the screen openings 22 to keep larger material in the impact zone for longer;

3) increasing the circumferential spacing of the openings 24 allowing larger material to be processed for longer before passing through;

4) providing the inner ribs 28*f* to increase residence time in the impact zones.

In a variation to the above described drive system 82 the main drive 98 may be in the form of a hydraulic pump powered by the PTO 130 which provides hydraulic fluid to a hydraulic motor coupled which drives the shaft 106. This avoids the need for the gearbox 100. A potential benefit in using the hydraulic motor is better speed control and the inherent ability to provide a soft start. This method is believed to be more efficient than directly driving two mills individually as it requires only one hydraulic motor which can be operated at optimum speed (slower) and pressure.

It should also be understood that when the residue processing system 80 or the combine harvester 120 has only a single residue processing device the corresponding drive system 82 is simplified by requiring: only a single drive belt drive and a single shaft in the event that the residue processing system has only one rotary component. In the event that the single residue processing device has counter rotating components then two belts will be required however the number of pulleys required to be driven is reduced in comparison to the above described processing systems and combine harvesters having two or more side-by-side residue processing devices.

Also in the above-described residue processing systems 80 the residue processing devices are exemplified by embodiments of the disclosed hammer mill 10. However the residue processing system 80 may use different types of residue processing devices such as but not limited to, pin mills, cage mills single stage hammermills, chaff spreaders and straw choppers. That is, the residue processing system 80 and the associated drive system 82 is independent of the specific type of residue processing device.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the hammer mill and residue processing system as disclosed herein.

The invention claimed is:

1. A multistage hammer mill comprising:
a plurality of milling stages arranged concentrically about each other; the plurality of milling stages arranged so that substantially all material in a first inner most of the milling stages passes through at least one subsequent adjacent milling stage, the plurality of milling stages including a first milling stage and a second milling stage, a central feed opening enabling material flow into a primary impact zone of the first milling stage;

the first milling stage comprising an impact mechanism and a first screen arrangement, the impact mechanism located in the primary impact zone and arranged to impact material entering the primary impact zone and accelerate the impacted material in a radial outward direction, the impact mechanism being capable of rotating about a rotation axis, the first screen arrangement disposed circumferentially about and radially spaced from the impact mechanism, the first screen arrangement being provided with a plurality of apertures through which impacted material of a first size range can pass;

the second milling stage comprising a second screen arrangement disposed circumferentially about and radially spaced from the first screen arrangement, the second screen arrangement being provided with a plurality of apertures through which impacted material of a second size range can pass, the second size range being the same as or different to the first size range, and one or more impact elements disposed between the first screen arrangement and the second screen arrangement.

2. The multistage hammer mill according claim 1 wherein the plurality of milling stages includes a third milling stage located about the second milling stage, the third milling stage having a third screen arrangement disposed circumferentially about and radially spaced from the second screen arrangement, and a plurality of one or more impact elements disposed between the second screen arrangement in the third screen arrangement, wherein material entering the third milling stage from the second milling stage is impacted and accelerated by the impact elements of the first milling stage and pulverised against the first screen arrangement.

3. The multistage hammer mill point claim 2 where in the third screen arrangement is provided with a plurality of apertures through which impacted material of a third size range can pass wherein a lower limit of the third size range is the same as or smaller than the lower limit of the second size range.

4. The multistage hammer mill according to claim 2 wherein the impact members of the second and third milling stages are formed as respective circular arrays each having a ring to which the impact members of that array are attached and further comprising a scraper associated with the array impact members for either one or both of the second and third milling stages, wherein the scraper is arranged to clear material from between the rings and the screen arrangements.

5. The multistage hammermill according to claim 1 wherein at least one of the impact elements comprises a first flat surface that lies parallel or within 20 degrees to a radial direction of the multistage hammermill.

6. The multistage hammer mill according to claim 5 wherein a radially inner side of the at least one of the impact elements comprises a second flat face which forms an acute angle with the first flat face.

7. The multistage hammer mill according to claim 6 wherein the at least one impact element comprises a curved surface extending between the first flat face and the second flat face.

8. The multistage hammer mill according to claim 1 wherein the one or more impact elements are arranged to rotate with the impact mechanism about the rotation axis.

9. The multistage hammer mill according to claim 1 wherein the screen arrangements are capable of rotating about the rotation axis.

10. The multistage hammer mill according to claim 9 wherein screen arrangements are capable of rotating in a direction opposite to the impact mechanism.

11. The multistage hammer mill according to claim 1 wherein a lower limit of the second size range is smaller than a lower limit of the first size range.

12. The multistage hammer mill according to claim 1 wherein the first screen arrangement comprises at least one first opening dimensioned to enable passage of impacted material too large to otherwise pass through the apertures in the first screen arrangement.

13. The multistage hammer mill according to claim 12 wherein the second screen arrangement comprises at least one second opening dimensioned to enable passage of impacted material too large to otherwise pass through the apertures in the second screen arrangement.

14. The multistage hammer mill according to claim 13 wherein at least one of the first openings at least partially overlaps in a radial direction with one of the second openings.

15. The multistage hammer mill according to claim 13 wherein the plurality of milling stages includes a third milling stage located about the second milling stage, the third milling stage having a third screen arrangement disposed circumferentially about and radially spaced from the second screen arrangement, and a plurality of one or more impact elements disposed between the second screen arrangement in the third screen arrangement, wherein material entering the third milling stage from the second milling stage is impacted and accelerated by the impact elements of the first milling stage and pulverised against the first screen arrangement, and the third screen arrangement comprises at least one third opening dimensioned to enable passage of impacted material too large to otherwise pass through the apertures of the third screen arrangement.

16. The multistage hammer mill according to claim 15 wherein the third openings are circumferentially wider than the second openings.

17. The multistage hammer mill according to claim 13 wherein the second openings are circumferentially wider than the first openings.

18. The multistage hammer mill according to claim 1 wherein at least one of the screen arrangements is provided with at least two openings, the openings being evenly spaced circumferentially about the respective screen arrangements; the at least one of the screen arrangements being formed from a plurality of screen segments which are circumferentially spaced from each other to form the respective openings of the at least one of the screen arrangements.

19. The multistage hammer mill according to claim 1 wherein the impact mechanism comprises a plurality of impact flails coupled to and extending radially from a central hub, the central hub being arranged to rotate about the rotation axis; and wherein at least one of the impact flails is capable of pivoting about a pivot axis which lies parallel to the rotation axis.

20. The multistage hammer mill according to claim 19 wherein at least one of the impact flails has an axial face provided with a plurality of grooves which extend in a circumferential direction.

21. The multistage hammer mill according to claim 1 wherein the first milling stage further comprising at least one substantially circular array of impact elements interposed between the impact mechanism and the first screen arrangement.

22. The multistage hammer mill according to claim 21 wherein the at least one circumferential array of impact elements is arranged to rotate with the impact mechanism.

23. The multistage hammer mill according to claim 22 wherein the at least one circumferential array of impact elements comprises a first circumferential array of impact elements located radially adjacent the impact mechanism and a second circumferential of impact elements located between the first circumferential array and the first screen arrangement and wherein the second circumferential array is arranged to rotate with the impact mechanism.

24. The multistage hammer mill according to claim 23 wherein the first circumferential array is arranged to (a) remain stationary; (b) rotate with and in the same direction as the impact mechanism; or (c) rotate in an opposite direction to the impact mechanism.

25. A combine harvester comprising:
   a power take off (PTO) rotating about a power axis perpendicular to a direction of travel of the combine harvester;
   least one multistage hammermill according to claim 1, each hammer mill having at least a first drive shaft for imparting rotation to the impact mechanism of the respective hammer mills about respective axes perpendicular to the power axis;
   a transmission system arranged to change a direction of drive from the PTO to each first drive shaft; and
   a belt drive arrangement coupled between the transmission system and each first drive shaft to transfer torque from the PTO to each first drive shaft.

26. The combine harvester according to claim 25 wherein the combine harvester comprises two or more multistage hammermills and the belt drive arrangement is configured to: drive each first drive shaft in the same direction as each other; or drive the first drive shafts in opposite directions.

27. The combine harvester according to claim 26 wherein the belt drive arrangement is further configured to drive the respective screen arrangements of the at least one multistage hammer mill in a direction opposite to the direction of rotation of the corresponding impact mechanism of a corresponding hammer mill.

28. The combine harvester according to claim 25 comprising a passive cooling system driven by the PTO and arranged to cool the transmission system, wherein the passive cooling system comprises one or a combination of any two or more of (a) a fan driven by a shaft coupled to the transmission system and rotating in a direction parallel to the first axis; (b) a fan driven by a shaft coupled to the transmission system to rotate in a direction parallel to the drive shafts; and (c) an airflow generated by the two or more residue processing devices.

29. The combine harvester according to claim 25 comprising: a chopper and wherein a discharge flow from the multistage hammer mills is directed to respective opposite axial ends of the chopper; or a chopper and a tailboard arranged to spread matter discharged from the chopper, wherein discharge flows from the multistage hammer mills is directed to the tailboard.

* * * * *